US006011878A

United States Patent [19]

Ushida et al.

[11] Patent Number: 6,011,878

[45] Date of Patent: Jan. 4, 2000

[54] IMAGE PROCESSING METHOD AND APPARATUS

[75] Inventors: Katsutoshi Ushida, Kawasaki; Nobuyuki Shigeeda, Ushiku, both of Japan

[73] Assignee: Canon Kabushiki Kaisha, Tokyo, Japan

[21] Appl. No.: 08/936,763

[22] Filed: Sep. 24, 1997

[30] Foreign Application Priority Data

| | | | |
|---|---|---|---|
| Sep. 26, 1996 | [JP] | Japan | 8-254917 |
| Dec. 24, 1996 | [JP] | Japan | 8-344307 |

[51] Int. Cl.$^{7}$ .......... G06K 9/32

[52] U.S. Cl. .......... 382/298; 382/299; 358/298; 358/456; 358/458

[58] Field of Search .......... 382/300, 299, 382/298, 237, 270; 395/102, 109; 358/455–459, 521, 466, 298, 443, 451, 447–448, 464

[56] References Cited

U.S. PATENT DOCUMENTS

| | | | |
|---|---|---|---|
| 5,109,282 | 4/1992 | Peli | 358/298 |
| 5,689,343 | 11/1997 | Loce et al. | 358/298 |
| 5,696,853 | 12/1997 | Kawana et al. | 382/299 |
| 5,760,922 | 6/1998 | Kojima | 358/464 |
| 5,862,305 | 1/1999 | Girmay et al. | 395/102 |

*Primary Examiner*—Leo H. Boudreau
*Assistant Examiner*—Ishrat Sherali
*Attorney, Agent, or Firm*—Fitzpatrick, Cella, Harper & Scinto

[57] ABSTRACT

Disclosed are an image processing method and apparatus for applying spatial filtering processing to n-bit multilevel image data, converting the processing image data to two-level or multilevel image data and converting the resulting image data to data capable of being expressed using high-resolution dots. The filtered image data is subjected to a luminance-to-density conversion and is further converted to two or four levels by a four-level/two-level conversion circuit which makes common use of circuitry for executing both two-level error diffusion processing and four-level error diffusion processing. The four-level/two-level conversion circuit clamps the error produced in four-level conversion processing to the number of significant bits of the error produced at execution of the two-level conversion processing. As a result, a common circuit can be used for both the two-level conversion processing and the four-level conversion processing.

8 Claims, 22 Drawing Sheets

FIG. 3A

| | | |
|---|---|---|
| A | | B |
| | X | |
| C | | D |

FIG. 3B

| | | | | |
|---|---|---|---|---|
| LINE 1 | –1 | | –1 | ⇦ LATCH DATA SHIFTED TWO BITS AND USED IN SPATIAL FILTERING OPERATION |
| LINE 2 | | 4 | | ⇦ LATCH DATA USED IN SPATIAL FILTERING OPERATION AS IS |
| LINE 3 | –1 | | –1 | ⇦ LATCH DATA USED IN SPATIAL FILTERING OPERATION AS IS |

LUMINANCE-DENSITY CONVERSION AT TWO-LEVEL CONVERSION

LUMINANCE-DENSITY CONVERSION AT FOUR-LEVEL CONVERSION

LUMINANCE-DENSITY CONVERSION AT FOUR-LEVEL CONVERSION

RECORDING CHARACTERISTIC OF FOUR-LEVEL DATA

RECORDING CHARACTERISTIC OF FOUR-LEVEL DATA

FOUR-LEVEL ERROR DIFFUSION AND RECORDING CHARACTERISTIC OF FOUR-LEVEL DEVELOPED DATA ACCORDING TO PRIOR ART

FOUR-LEVEL ERROR DIFFUSION AND RECORDING CHARACTERISTIC OF FOUR-LEVEL DEVELOPED DATA ACCORDING TO THIS EMBODIMENT

IMAGE PROCESSING METHOD AND APPARATUS

BACKGROUND OF THE INVENTION

This invention relates to an image processing method and apparatus. More particularly, the invention relates to an image processing method and apparatus for entering n-bit multilevel image data and subjecting each pixel of the multilevel image data to processing to convert each pixel to values of two levels or m levels (n>m>2).

A facsimile machine is capable of transmitting the image of a document that has been read by a scanner. The document image is always read at a specific resolution and the read image data is binarized (converted to bi-level image data) without processing being executed in conformity with the purpose of the image data output, i.e. whether the read image data is to be transmitted or merely copied. Similarly, with regard to the number of tones used in error diffusion processing, which is pseudo-halftone processing generally employed in a facsimile machine, 64 tones (expressed by six bits) are invariably employed regardless of whether the image data is transmitted or copied.

Printers such as laser printers capable of recording at high resolutions are now available at low cost and can be used to perform multilevel recording such as four-level recording. For example, if a recording apparatus having a resolution of 1200 dpi (dots per inch) in the main-scan direction is used to record image data having a main-scan resolution of 400 dpi, four-level recording can be implemented by forming one pixel of 400 dpi by three small dots, in which the number (three in this case) of small dots of 1200 dpi is made to correspond to the density value of the input image. Of course, if two-level (binary) recording is performed at 400 dpi, all three of the small dots of 1200 dpi should be made to correspond to black in case of black and to white in case of white.

The trend toward combining copiers and facsimile machines has accelerated in recent years so that now it is required that even a facsimile machine provide high-quality printing in 256 tones or more when used for copying. Accordingly, consider a case where document image data that has been read by the scanner of a facsimile apparatus is transmitted. When two-level image data corresponding to 64 tones, for example, is produced by binarization processing and the data is used to produce a copy, it is desired that image data of 256 tones be generated by m-level conversion processing in order to exploit the recording characteristics (resolution, tonality, etc.) of the printer section to the maximum extent. When such image processing is executed, two-level (binary) error diffusion processing is used widely as the binarizing image processing. As for processing for a conversion to m levels, wide use is made of m-level error diffusion processing in which the binary error diffusion processing is expanded and the output value is converted to m levels. These functions are provided separately in each apparatus in conformity with the purpose of the apparatus.

However, when a two-level (binarizing) processing circuit for converting a read image to two levels in order to transmit the image and a multilevel conversion processing circuit which executes multilevel conversion processing for copying the read image are constructed in the above-mentioned facsimile machine by separate circuits, the result is a facsimile machine that is high in cost.

In a case where image data having multiple tones is printed, there is a method which uses a multilevel printer capable of expressing the grayscale by one dot (pixel), as well as a method which, when a two-level (binary) printer is used, controls the dot size, which is printed by the printer, in dependence upon the value of the multilevel image data to thereby express tones artificially (this is referred to as pulse width modulation, or PWM, below). In the case of the multilevel printer, there is a method of expressing multiple tones by printing while changing ink density, and a method of controlling pixel dot diameter and controlling printed image density depending upon area tone (halftone expressed by changing a ratio of black portion to white portion in a unit area). An example of a multilevel printer using the former method is an ink-jet printer, and an example of a multilevel printer using the latter method is a laser printer.

In case of a binary printer (i.e. a bi-level grayscale printer), there is only one type of ink density possible with an ink-jet printer. If a laser printer of this kind is used, dot diameter of the pixels recorded is fixed. Consequently, in a situation where a binary printer is used, tonality cannot be expressed by one dot alone. Accordingly, use is made of a method (digital PWM or DPWM) in which tonality is expressed artificially by arranging a plurality of dots to correspond to the density of the image data. Since this technique has the advantages of simple printer control and low cost, it is employed in digital copiers and in many multimedia apparatus in which a facsimile function is combined with other functions.

FIGS. 23A and 23B are diagrams useful in describing the principle of such tone expression in case of a multilevel printer and binary printer, respectively.

FIG. 23A is a diagram showing an example of printing by a multilevel printer using area tone, and FIG. 23B is a diagram showing an example of printing by a binary printer. In either case the resolution of input pixels is assumed to be 400 dpi. In the case of the multilevel printer, dot diameter varies depending upon input pixel density, with dot diameter becoming progressively smaller as density decreases (become brighter), as indicated at 1102~1105 in FIG. 23A. This is how density is expressed. By contrast, in the example of the binary printer as shown in FIG. 23B, the smallest dots can be printed at a resolution higher than the input pixel resolution. In the example of FIG. 23B, where the input pixel density is 400 dpi, printing can be performed by 1200-dpi dots, which is a three-fold increase. In this case the dots that constitute the 400 -dpi pixel are a maximum of three in number (in case of representation by a single line), and the number of tones that can be expressed is a maximum of four (0~3), as indicated at 1112~1115.

Assume a scenario in which 256 -tone multilevel image data, in which each pixel is represented by eight bits, is entered and then output to a multilevel printer and to a binary printer. In the case of the multilevel printer, printing can be performed directly in 256 tones because tones can be expressed merely by controlling the printed dot diameter. In order to express 256 tones using the binary printer, on the other hand, it is required that one pixel be expressed by 255 bits in view of the principles described earlier (the method of controlling dot diameter on one line). In case of one pixel at 400 dpi, the size of one dot requires a resolution of 102,000 dpi. In actuality, printer resolution rises far and away the ordinary resolution (1200 dpi and 2400 dpi etc.) and expression of tonality for requesting the printer of high resolution is impossible.

Accordingly, a grayscale conversion by pixel processing is required before printing is performed by digital PWM, especially in the case of a binary printer. Conventionally, the error diffusion method or average density method is used as the method of grayscale conversion. Specifically, a method in practical use involves applying the grayscale conversion to a 256 -tone image each pixel of which is represented by eight bits, creating a four-tone pseudo-halftone image each pixel of which is represented by two bits, and then printing the image data by digital PWM.

Methods of achieving multilevel image recording using such a binary printer include fixed thresholding, dithering, error diffusion of two-tone output, and the average density method, by way of example. All of these methods convert multilevel image data to binary image directly and differ in terms of the relative importance of image quality and processing. However, in order to adapt these methods to make higher definition and higher quality printing possible using a high-resolution printer, it is necessary to perform a resolution conversion by high magnification or to increase reading resolution to conform to the resolution of the recording system. In this case the size of the processing system would be too large and costs would rise, making it difficult to manufacture the product at low cost. For these reasons, products which use the above-mentioned four-level grayscale conversion method and digital PWM have increased in recent years.

FIG. 24 is a diagram useful in describing digital PWM in greater detail. In FIG. 24, 1301, 1302 denote output dot patterns of tones for odd-numbered pixels and even-numbered pixels, respectively. Here the input is a four-tone input, in which 1303, 1304, 1305 and 1306 indicate tone 3 (density 255), tone 2 (density 170), tone 1 (density 85) and tone 0 (density 0). The pixel data enters the digital PWM block in line units and the processing shown in FIG. 24 is executed for each item of pixel data.

The output dot pattern is reversed (by toggle processing) at the odd-numbered (ODD) and even-numbered (EVEN) pixels of the input pixel data. That is, the output pattern always reverses for each item of input pixel data. The purpose of this is to cause dot strings of the output pattern to gather together at mutually adjacent pixels. Whereas the size of one pixel of the input image data corresponds to 400 dpi, the size of a printed dot corresponds to 200 dpi, in the manner illustrated, because two neighboring pixels join together. Adopting this expedient is effective in removing high-frequency components superposed on the image. In particular, it is possible to make false contours, which are produced by four-level error diffusion, less conspicuous.

The above-described digital PWM makes it possible to perform printing, without causing a deterioration in image quality, using a high-resolution binary printer, even if the reading resolution is low. The final product can be manufactured at comparatively low cost. Extremely good effects are obtained when a halftone (photographic) image is printed using a binary printer.

On the other hand, a drawback is that the resolution of characters and line drawings declines, jaggies develop at the contours and straight lines appear disconnected. The reason for this is that in digital PWM processing, the output patterns of the odd- and even-numbered pixels are reversed, neighboring output patterns become connected and black dots or white dots are output in enlarged form.

FIG. 25 is a schematic view for a case in which the toggle processing in digital PWM is turned off so that the same dot pattern is output for both odd- and even-numbered pixels. If toggling is suspended and digital PWM corresponding to 400 dpi is executed, excellent printing can be performed even with regard to characters and line drawings. Now, however, if a character or line drawing includes portions which share a halftone density, there is the danger that false contours and other problems will occur.

SUMMARY OF THE INVENTION

Accordingly, an object of the present invention is to provide an image processing method and apparatus through which the image quality of an output image is improved by changing over the output pattern of m-level error diffusion in a specific density area of input image data.

Another object of the present invention is to provide an image processing method and apparatus capable of reducing the storage capacity of a line buffer that is for the purpose of extracting reference pixel data in the sub-scan direction in order to perform filtering processing.

Still another object of the present invention is to provide an image processing method and apparatus through which a decline in output image quality is prevented by changing over the output range of a luminance—density conversion in correlation with succeeding-stage of binarization or multi-level conversion processing and inhibiting conversion to a density that influences output.

Still another object of the present invention is to provide an image processing method and apparatus in which, when image data that has been converted to m levels is developed into dots, the quality of an image recorded using dots can be improved by arranging the dots in such a manner that dots in a case where pixels of m-level input image data are even-numbered and dots in a case where pixels of m-level input image data are odd-numbered will be symmetrical.

Still another object of the present invention is to provide an image processing method and apparatus through which reproducibility of an edge portion contained in an image can be improved by determining whether a pixel of interest in m-level input image data has an intermediate value and, if the pixel of interest has an intermediate value, referring to pixels neighboring the pixel of interest on the right and left, and deciding the arrangement of the dots depending upon results of comparing the neighboring pixels with the pixel of interest.

A further object of the present invention is to provide an image processing method and apparatus through which digital PWM that makes it possible to obtain excellent image quality with regard to both halftone images and characters or line drawings can be executed.

A further object of the present invention is to provide an image processing method and apparatus so adapted that digital PWM can be executed commonly for all types of images by a single algorithm.

A further object of the present invention is to provide an image processing method and apparatus so adapted that printing can be performed by a binary printer with reduced image deterioration by outputting a character or line drawing at a high resolution and a halftone image at a lower resolution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principle of the invention.

FIGS. 3A, 3B are diagrams illustrating the correspondence between examples of coefficients of a spatial filter and line buffers in the first embodiment;

DESCRIPTION OF THE PREFERRED EMBODIMENTS

Preferred embodiments of the present invention will now be described in detail with reference to the accompanying drawings.

Figure 1:
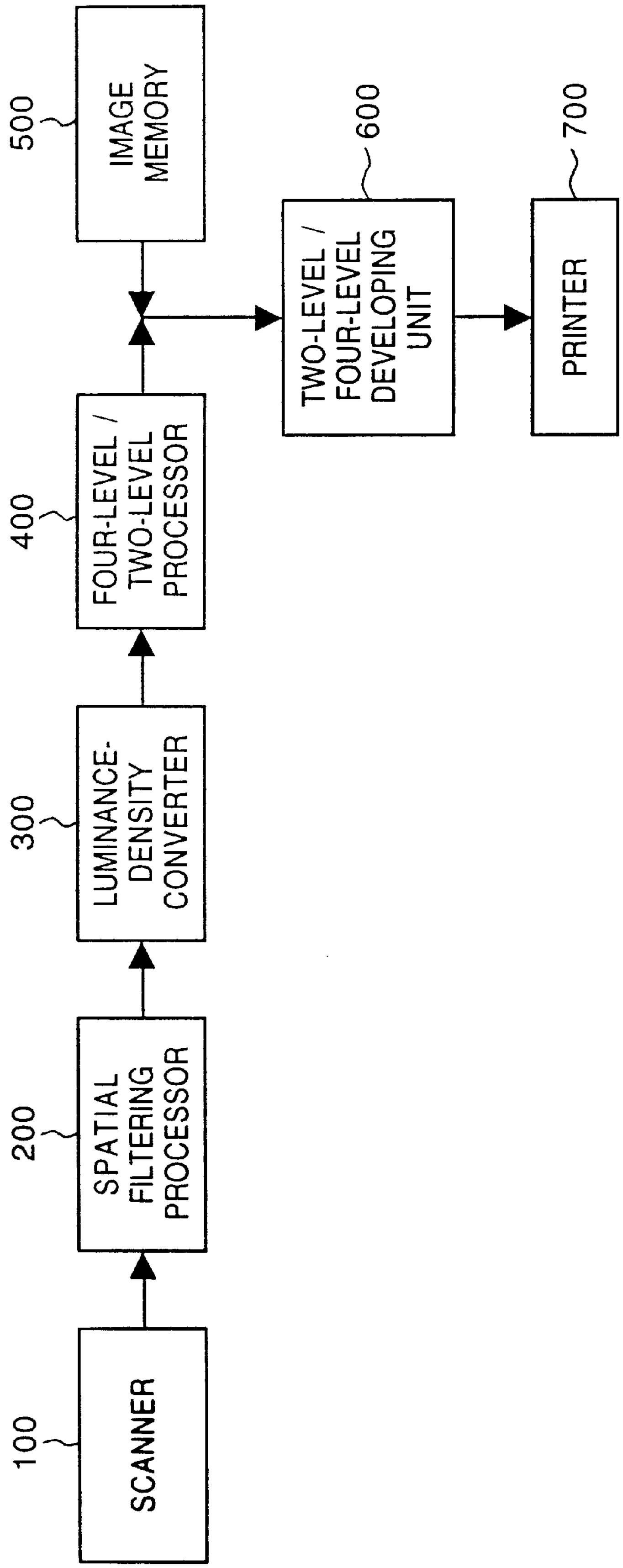
FIG. 1 is a functional block diagram illustrating the functional configuration of an image processing apparatus according to a first embodiment of the present invention.

FIG. 1 is a functional block diagram illustrating the overall functions of an image processing apparatus according to an embodiment of the present invention.

As shown in FIG. 1, the apparatus includes a scanner 100 for reading the image of a document using a CCD (a solid-state image sensing device) or the like, converting an analog image signal, which is output in dependence upon the image read, to a digital signal using, say, an 8-bit A/D converter, and outputting the digital signal as 256 -tone image data, namely data in which each pixel is represented by eight bits. At the same time that it reads the image, the scanner 100 subjects the image data to correction processing, such as a shading correction, to correct for the CCD and optical system. The image data, in which each pixel is represented by eight bits, output by the scanner 100 enters a spatial filter processing unit 200, which subjects the image data to two-dimensional spatial filtering to compensate for the resolution of the image data. If zooming is necessary, variable magnification by linear interpolation (not shown) can be executed between the scanner 100 and spatial filter processing unit 200. A luminance-density converter 300 converts the image data (luminance data), whose resolution has been compensated by the spatial filter processing unit 200, to density data using a look-up table or the like. It should be noted that table data from a controller 110 (FIG. 2) of the image processing apparatus of this embodiment is downloaded to the look-up table of the luminance-density converter 300 in dependence upon whether the image is dark or light and the image processing mode, such as two-level and four-level conversions, described later. Further, the look-up table employs data to which a correction has been applied taking into consideration the recording characteristic of the printer 700. The correction is based upon a LOG conversion curve.

The density data output by the luminance density converter 300 enters a four-level and two-level conversion processing unit 400, which executes two-level (binarization) or four-level conversion processing and outputs the processed data. An image memory 500, which is constituted by DRAM or SRAM or the like, accumulates image data as an image file. The image data accumulated is that read by the scanner and composed of pixels each of which is represented by one bit or two bits owing to the binarization or four-level conversion processing, or image data that has entered via a communication line, not shown. For a printer 700 whose main-scan recording resolution is 1200 dpi, 400-dpi binary image data or 400-dpi four-level image data enters a two-level and four-level development unit 600, which subjects each of these types of image data to optimum 1200-dpi layout of small dots before outputting the data to the printer 700. The latter, which is a laser printer or ink-jet printer having a resolution of, say, 1200 dpi, prints the image data on a recording medium (recording paper or the like) using the binary data ("0" or "1") developed by the two-level and four-level development unit 600.

Though this embodiment is described in connection with a case where multilevel error diffusion processing is four-level conversion processing, this does not impose a limitation upon the present invention and it goes without saying that m-level conversion processing can be employed in general in dependence upon the resolution of the printer 700.

Figure 2:
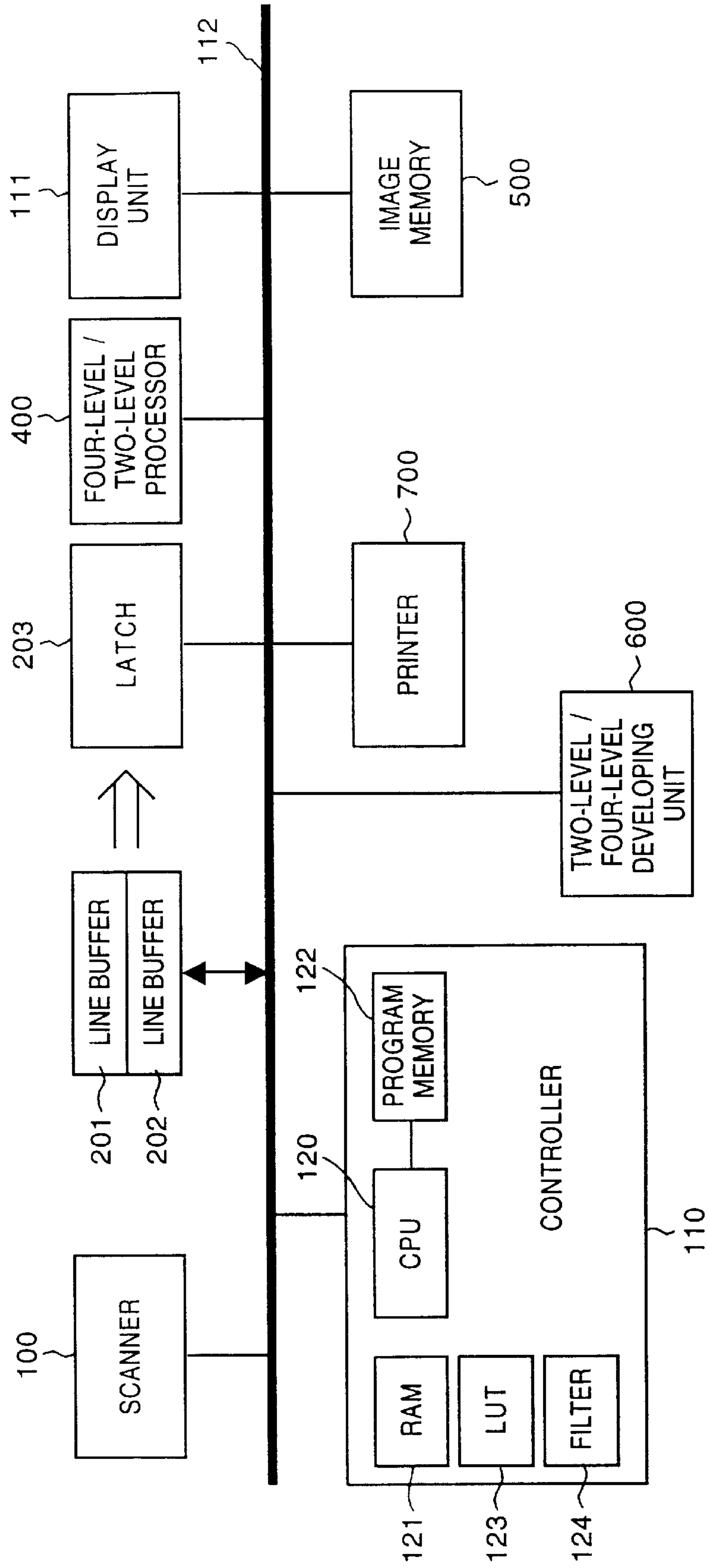
FIG. 2 is a block diagram showing the construction of the image processing apparatus according to the first embodiment.

FIG. 2 is a block diagram showing the construction of the image processing apparatus according to this embodiment. Components identical with those shown in FIG. 1 are designated by like reference characters and need not be described again.

The controller 110 controls the overall apparatus described above and includes a CPU 120 of a microcomputer or the like, a RAM 121, used as a work area when the CPU 120 executes processing, for temporarily saving various data, and a program memory 122 for storing the control program of the CPU 120 as well as data. A look-up table (LUT) 123 stores a table used in the above-mentioned luminance-density conversion. A filter 124 stores Laplacian filter constants used in the spatial filter processing unit 200. A display unit 111 displays the document image read by the scanner 100 as well as images that have been subjected to various processing. Line buffers 201, 202 are used in spatial filter processing, described later. According to this embodiment, the line buffers 201, 202 are so adapted that common use is made of one RAM address, at which 14 bits of data can be stored. A latch circuit group 203 latches the output values of the line buffers 201, 202, described later.

It should be noted that the spatial filter processing unit 200 is implemented by the controller 110, line buffers 201, 202 and latch group 203, and that the processing executed by the luminance-density converter 300 is carried out by the CPU 120 of the controller 110. Though the four-level and two-level conversion processing unit 400 and two-level and four-level development unit 600 are constituted by hardware in this embodiment, these may be implemented by programs executed by the CPU 120.

[First Embodiment]

The features of the various processing units of the first embodiment of the invention will now be described in detail.

<Spatial filter processing unit 200>

Ordinarily, in order to subject image data to spatial filtering, the number of line buffers required is equal to the number of reference lines or is one less than the number of reference lines. Conventionally, such line buffers are constituted by an external SRAM or the like, and many SRAMs having a bit width of eight bits are prepared. Accordingly, if the input data is eight bits, no particular problems arise in terms of apparatus cost even if all of the reference line buffers are composed of 8-bit memories. However, owing to the recent progress that has been made in integrated circuit technology, SRAMs used for external reference buffers can now be built in with ease. When line buffers are built in, however, memory storage capacity is reflected directly in the cost of manufacture. This makes it necessary to reduce memory capacity. For this reason, the significant digits of a reference buffer are reduced in this embodiment to such an extent that the influence of arithmetic operations will be small, thereby making it possible to both maintain apparatus performance and reduce the cost of the apparatus.

FIG. 3A is a diagram illustrating an example of the matrix of a Laplacian filter for resolution compensation used comparatively often, and FIG. 3B is a diagram useful in describing a line buffer employed in this matrix operation.

In order to execute processing for spatial filtering by referring to three lines of image data (pixel data), two 8-bit line buffers are needed in order that pixels in the sub-scan direction are referred to at the same time. In the first embodiment, balance between apparatus performance and cost is maintained by reducing the number of bits of line 1, where the influence of arithmetic operations is comparatively small, from eight bits to six bits. As a result, in a case where image data of size B4 is stored at 400 dpi, memory storage capacity can be reduced by 8192 bits.

Figure 4:
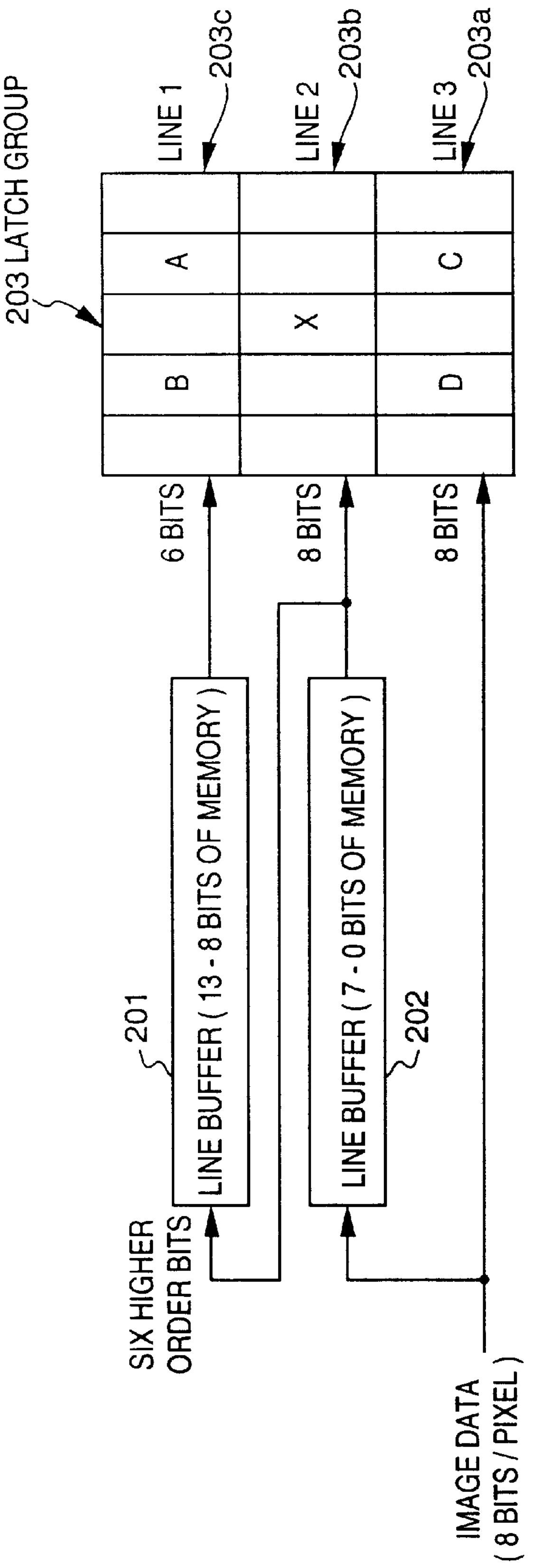
FIG. 4 is a block diagram showing the construction of a spatial filter processing unit according to the first embodiment.

FIG. 4 is a block diagram illustrating the arrangement of line buffers and latch group in the spatial filter processing unit 200.

The line buffers 201, 202 are for delaying pixel data in the sub-scan direction so that three lines of pixel data are referred to simultaneously. The latch group 203 delays the pixel data in the main-scan direction. The data for spatial filter processing is extracted from the latch group.

In this embodiment, one pixel of image data is represented by eight bits, the line buffers 201, 202 are constituted by one RAM (14 bits per address), the eight lower order bits (0~7) of the RAM are allocated to the line buffer 202, which applies a delay of one line, and the six higher order bits (8~13) of the RAM are allocated to the line buffer 201, which applies the delay of two lines.

Input pixel data (eight bits) is latched directly in a latch circuit group 203*a* corresponding to line 3 of the latch group 203, the output data (eight bits) of the line buffer 202 is latched in a latch circuit group 203*b* corresponding to line 2, and the output data (six bits) of the line buffer 201 is latched in a latch circuit group 203*c* corresponding to line 1.

Figure 5:
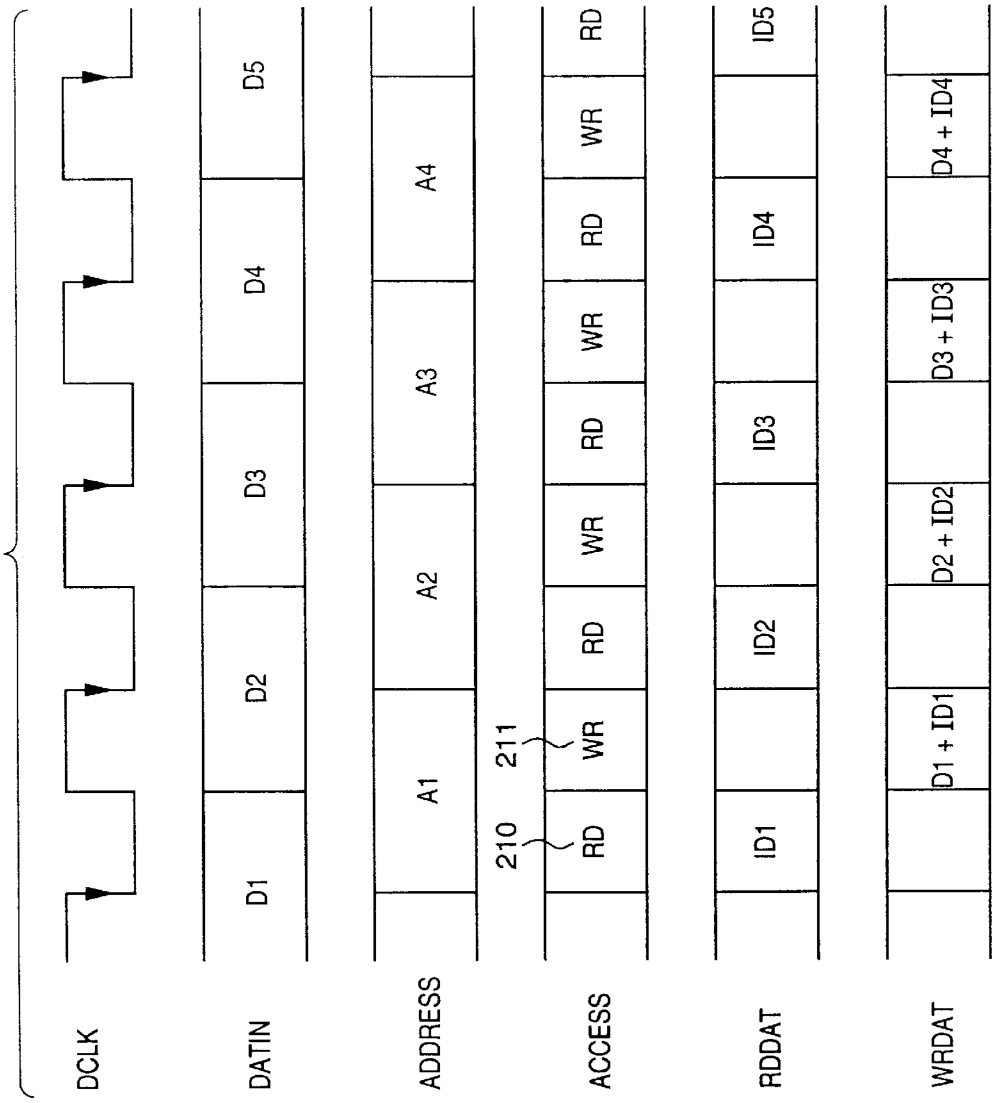
FIG. 5 is a timing chart useful in describing the timing of memory access in the spatial filter of the first embodiment.

FIG. 5 is a timing chart useful in describing the timing of memory access in the spatial filter processing unit 200 of the first embodiment.

Image data (DATIN) which enters in sync with the leading (rising) edge of a clock (DCLK) is stored at designated addresses (A1~An) of the line buffers 201, 202 in sync with the leading (rising) edge of the clock (DCLK). "Access" in FIG. 5 shows the timing of access to data that has been stored in these line buffers, in which RD represents readout timing and WR write timing. For example, at readout (RD) timing 210 in FIG. 5, data (ID1), which is the result of applying a two-bit shift to data "D1" stored at address "A1" of the line buffer (RAM), is read out (indicated at RDDAT), then the data (ID1) two-bit shifted and read out is combined with the original data (D1) at the write timing (WR) 211, and the combined data is stored at the same address (A1). As a result, the original pixel data (D1) is placed at the lower order bits (0~7) of this address (A1), and the two-bit shifted data (ID1) is placed at the higher order bits (8~13) of this address (A1). Thus, it is so arranged that the reading address and the writing address become the same, and the updating of the RAM (line buffers) is performed by read and modified write. By repeating this operation, pixel data delayed by one line is stored at the lower order bit (0~7) positions (which correspond to the line buffer 202) of the RAM, and pixel data delayed by two lines is stored at the higher order bit (8~13) positions (which correspond to the line buffer 201) of the RAM.

The items line-delayed image data read out of the line buffers 201, 202 and the items of entered image data (DATIN) are successively latched by the latch group 203 in sync with the leading (rising) edge of the clock (DCLK). The items of data read out of the line buffers 201, 202 and the items of image data which enter are each shifted successively in the latch group 203 in sync with the leading (rising) edge of the clock (DCLK). As a result, two-dimensional (3×3) image data is extracted.

Of the data latched in the latch group 203, the items of data indicated at X, A, B, C in FIG. 4 correspond to the positions X, A, B, C, D of the spatial filter shown in FIG. 3A. In the actualoperation performed by the spatial filter, the values that correspond to A and B are values only of the six higher order bits of the memory, and therefore a bit shift is performed, "00" is inserted into the two lower order bits and processing is executed with 8-bit data.

filter=X<<2−((A<<2)+(B<<2)+C+D)

The above equation expresses the operation of the spatial filter of this embodiment in C language. Further, since the filter coefficient is "4", X is shifted two bits to the left (×4), and A, B are each shifted two bits to the left in order to handle the 6-bit data in the same manner as the other 8-bit data. In a case where this operation is implemented by hardware in an actual apparatus, the bit shift is achieved by shifting the bit positions in the wiring from the latch group 203 to the adder. The spatial filter value obtained is further added to the X data and the result is output as image data, in which each pixel is represented by eight bits, that has been compensated for resolution. In a case where such an operation is implemented by software, this can be realized with ease by executing a register shift instruction and performing addition. <Luminance-density converter 300>

The luminance data of eight bits per pixel subjected to resolution compensation by the spatial filter processing unit 200 enters the luminance-density converter 300, which proceeds to convert the data to density data by referring to the look-up table and then output the density data. As mentioned earlier, the luminance-density conversion table employs the results obtained by applying a correction of the recording characteristic of printer 700 to the LOG conversion.

In this embodiment, the conversion to density data is carried out to obtain a data width necessary for the four-level and two-level conversion processing unit 400 in conformity with the two-level conversion processing mode and four-level conversion processing mode.

First, according to this embodiment, data processing is executed with solid white data "0" taken as being "0" and solid black data "63" taken as being "1" in a case where binary error diffusion processing is performed.

Figure 6A:
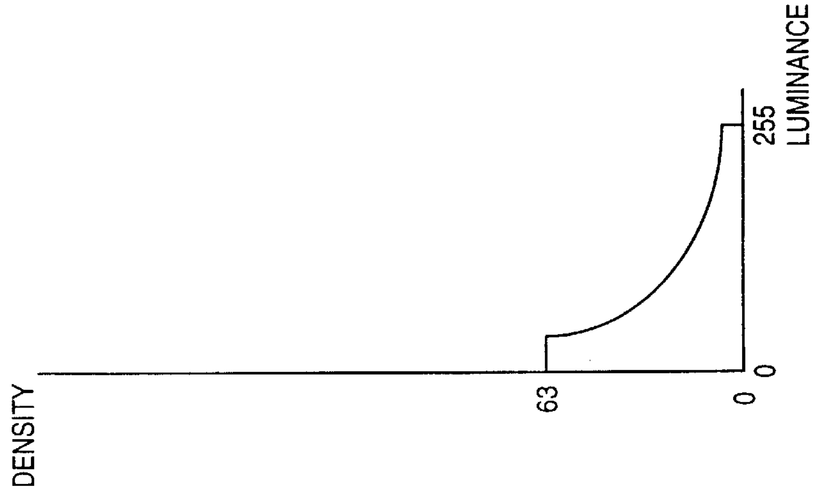
FIG. 6A is a graph showing the luminance-density characteristic of a binary error diffusion processing unit in the first embodiment.
Figure 6B:
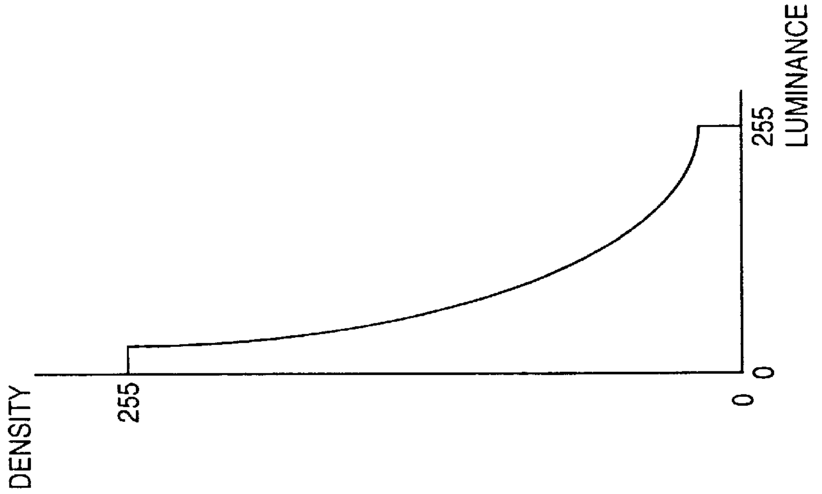
FIGS. 6B and 6C are graphs showing the luminance-density characteristic of a four-level error diffusion processing unit in the first embodiment.

FIG. 6A is a graph showing an example of a luminance-density conversion characteristic for two-level (binary) error diffusion processing.

In case of two-level error diffusion, 8-bit image data, namely image data of "0"~"255", is entered, a conversion is made to 6-bit density data, namely density data of "63"~"0", and the density data is output.

In case of four-level error diffusion, 8-bit image data is converted to four-level data, in which solid white data "0" is "0" and solid black data "255" is "3".

Depending upon the capability of the printer 700, there are instances where the recorded image quality declines (the image is coarsened) when the output pattern of a specific density is recorded. For example, in a case where printing is performed by executing four-level error diffusion processing using 256-tone image data in which each pixel is represented by eight bits, the image represented by an output pattern of density data where density is approximately "31" tends to coarsen. The reason is believed to be that in image data of density "31", the output data takes on a checkered state of "0"s and "1"s owing to the characteristic of the four-level error diffusion, and the recording characteristic of the printer 700 is incapable of following up the checkered data. In such case, a luminance-density conversion table is created in which image data having a density (here a density of "31") that results in coarsening of the recorded image is skipped.

Figure 6C:
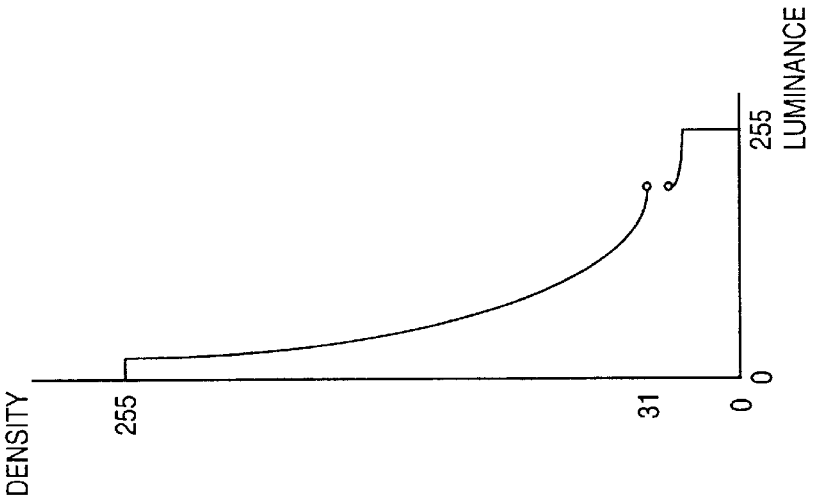

FIG. 6C is a graph showing an example of the characteristic of a luminance-density conversion table created by thus skipping the density "31".

<Two-level and four-level conversion processing unit 400>

Figure 7:
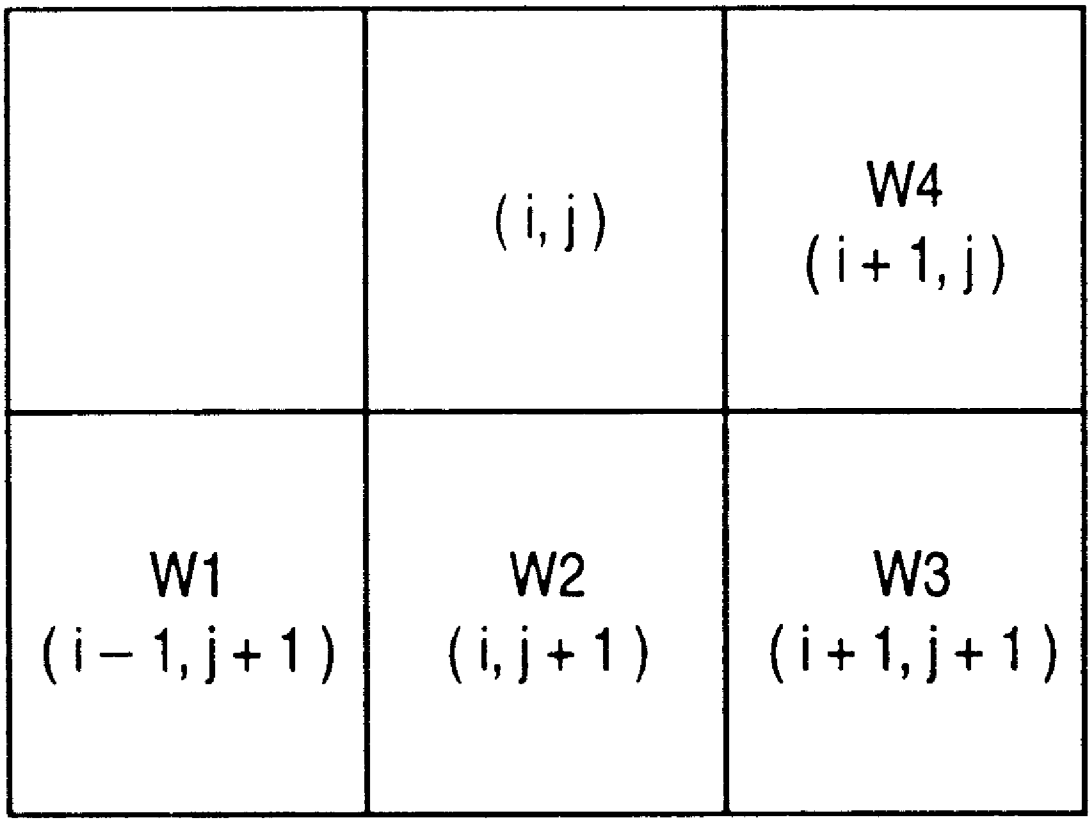
FIG. 7 is a diagram showing the weighting of error distribution in two-level and four-level error diffusion processing in the first embodiment.

First, m-level conversion processing will be described in relation to an algorithm for four-level error diffusion processing. The difference between two-level (binary) error diffusion and four-level error diffusion is that error is calculated from three threshold values and four output densities in the latter. In a manner similar to that of two-level error diffusion, four-level error diffusion takes the difference between output pixel density (here DENT3=255, DENT2=170, DENT1=85, DENT0=0) and a corrective density X'ij (the sum total of pixel density Xij and amount of error diffusion) and diffuses this difference (X'ij −DENTi) to adjacent pixels as a new error while applying weighting that corresponds to an error distribution matrix, as shown in FIG. 7. In processing relating to the distribution of error to adjacent pixels, the corrective density X'ij is given by $$X'ij=Xij+SUM\ (Ekl\times\alpha kl)/SUM\ (\alpha kl)$$

in both two-level error diffusion and four-level error diffusion, where α represents the weighting coefficient for distributing error and Ekl represents the error produced by the processing of pixel previously.

The signal level of the corrective density X'ij is judged by three threshold values using Equations (1)~(4) below, and the recording output signal level (OUTPUT) and amount of error (E) are decided.

The threshold values are TH1=(DENT1+DENT0)/2, TH2=(DENT2+DENT1)/2 and TH3=(DENT3+DENT2)/2.

If X'ij>TH3 holds, then output pixel density OUTPUT=3 and error E=X'ij−DENT3 (1)

If TH3≧X'ij>TH2 holds, then output pixel density OUTPUT=2 and error E=X'ij−DENT2 (2)

If TH2≧X'ij>TH1 holds, then output pixel density OUTPUT=1 and error E=X'ij−DENT1 (3)

If TH1≧X'ij holds, then output pixel density OUTPUT=0 and error E=X'ij−DENT0 (4)

Here the newly produced error E=X'ij−(DENT3, DENT2, DENT1, DENT0) is weighted as shown in FIG. 7 and distributed again to the adjacent pixels. By repeating this operation, the 8-bit input image data (0~255) is converted to data having any of four levels (0~3), which is delivered as an output.

In the case of two-level error diffusion processing, the densities for error calculation in the above-described four-level error diffusion are made BDENT1=63 and BDENT0=0 and the threshold value is made BTH1=(BDENT1+BDENT0)/2. Then, as indicated by Equations (5) and (6) below, error (E) decided in conformity with the output pixel density (OUTPUT) is weighted as shown in FIG. 7 and diffused as a new error in a manner similar to that set forth above.

If X'ij>BTH1 holds, then output pixel density OUTPUT=1 and $$\text{error } E=X'ij-BDENT1 \quad (5)$$

If BTH1≧X'ij holds, then output pixel density OUTPUT=0 a s nd $$\text{error } E=X'ij-BDENT0 \quad (6)$$

In the first embodiment, note is taken of the fact that the operation for distributing error is common forth both two- and four-level error diffusion processing, and therefore the processing block for distributing error and an access block of an error buffer 418 (FIG. 8) are made a common block, thereby making it possible to realize four-level error diffusion and two-level error diffusion simultaneously while preventing an increase in the scale of the apparatus. More specifically, when the arithmetic circuit for distributing error is composed of the effective bits of four-level error diffusion, which has a large number of effective bits, and these are stored in the error buffer 418, the number of effective bits is clamped to the number of effective bits of two-level pixel diffusion, whereby the size of the error buffer 418 is kept small. In the first embodiment, the error buffer 418 is composed of six bits and the amount of error calculated at storage in the error buffer 418 is clamped to "−32"~"+31".

Figure 8:
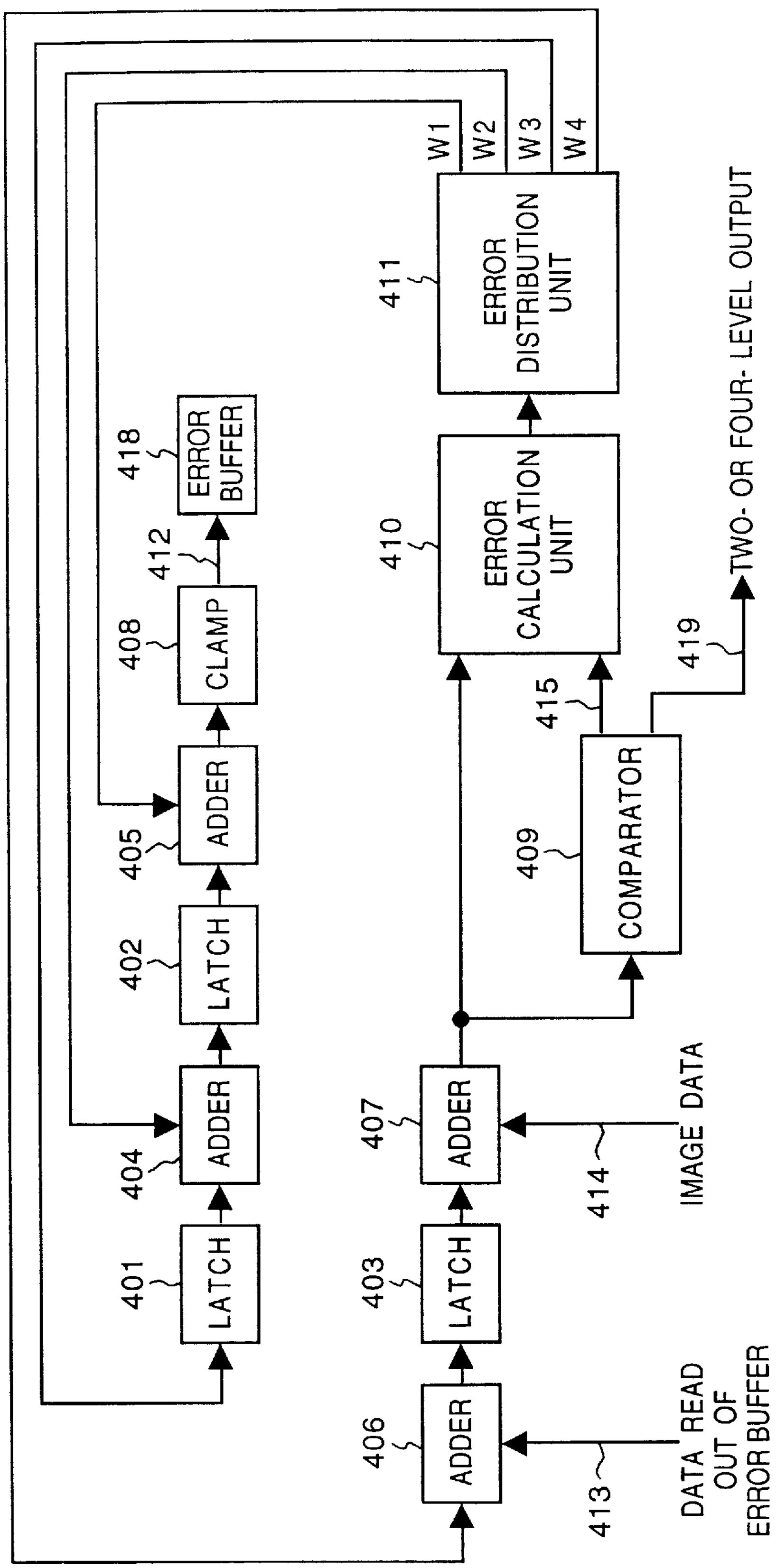
FIG. 8 is a block diagram illustrating the construction of a two-level and four-level error diffusion processing unit in the first embodiment.

FIG. 8 is a block diagram illustrating an example of an error diffusion circuit for executing both two-level and four-level error diffusion according to the first embodiment.

The circuit includes latch circuits 401~403 which hold error data to be weighted and diffused. The data is updated in sync with a pixel clock. Adders 404~407 add data, output by an error distributor 411, in which error produced when pixels are processed has been distributed. A clamping processing circuit 408 clamps the output data of the adder 405 to "−32" if the data is less than "−32" and to "+31" if the data is equal to or greater than "+31", converts the data to 6-bit coded data ("−32"~"31") and outputs the converted data to the error buffer 418. In dependence upon two-level or four-level error diffusion processing mode, a comparator 409 compares an error density value, which has been corrected by the error data output from the adder 407, with a threshold value and produces an output value 419 as well as a signal 415, which selects the calculation equation for calculating error. An error calculating unit 410, which receives the selection signal 415 from the comparator 409 and the results of addition from the adder 407 as inputs, calculates a new amount of error of a pixel of interest decided thereby and outputs the amount of error. The error distribution unit 411 weights the new amount of error, which is output by the error calculating unit 410, using the weighting coefficients corresponding to FIG. 7, and distributes the error to the adders 404, 405, 406. The above-mentioned error buffer is shown at 418.

The flow of data in the four-level and two-level conversion processing unit 400 will be described taking four-level error diffusion processing as an example. It should be noted that two-level error diffusion is executed through a processing flow similar to that of four-level error diffusion processing, described below, with the only difference being the threshold values and the calculation equation for calculating new error.

First, input image data 414 is added to the output (diffused error data) of latch 403 in the adder 407, and the sum is output to the comparator 409 and error calculating unit 410. The comparator 409 compares the corrected pixel data, which is the output of adder 407, with each of the threshold values TH1~TH3, decides the four-level outputs, as indicated by Equations (1)~(4) above, and simultaneously outputs the selection signal 415, which selects the calculation equation for the new amount of error, to the error calculating unit 410. The error calculating unit 410, which has subtracting circuits (not shown) corresponding to the Equations (1)~(4), selects which results of Equations (1)~(4) to use in dependence upon the selection signal 415 from the comparator 409 and outputs a new amount of error.

It should be noted that calculation of the new amount of error may be performed by changing over the values to undergo subtraction in the subtractors of the error calculating unit 410 by means of the selection signal 415 from the comparator 409.

The new amount of error output by the error calculating unit 410 is subjected to weighting corresponding to FIG. 7 by the error distribution unit 411, and the results are output to the adders 404, 405, 406 and latch 401. Here an error weighted by "W3" is latched in the latch 401, whereby the error is added to the error weighted by "W2", generated by the error calculation for the next pixel, in adder 404. The output of the adder 404 is latched in the latch 402 and is further added to the error weighted by "W1", generated by the error calculation for the next pixel, in adder 405. The output of adder 405 is the amount of error diffused to the next processing line. The clamping circuit 408 applies clamping processing to the 6-bit data coded "−32" to "31" and outputs the resulting signal. This output is stored temporarily in the error buffer 418 in order to be delayed by one line of data and is read out when the next line is processed.

The adder 406 adds the delayed value read out of the error buffer 418 and the error weighted by "W4". The sum is latched in the latch 403. The latter outputs the sum total of diffused errors as amount of correction. The flow then returns to the adder 407, where the sum total of diffused errors is added to the input image data 414. As a result, the four-level image data 419 is output from the comparator 409.

As described above, the input image data 414 is binarized when the two-level error diffusion mode is in effect and is converted to four-level data when the four-level error diffusion mode is in effect, and either two-level data or four-level data is output. The effective number of bits of each latch and each adder is decided by the effective number of bits in four-level error diffusion processing.

<Two-level and four-level development unit 600>

In order to output image data having a resolution of 400 dpi in the main-scan direction to the printer 700, which is capable of binary recording at a resolution of 1200 dpi, the two-level and four-level development unit 600 converts the data to 1200-dpi "0" (white) or "1" (black) image data depending upon the input data.

In a case where the input data is four-level image data, the four values are made to correspond to numbers comprising three small dots at 1200 dpi. If a value is "0", all of the 1200-dpi small dots are output as "0"s. If a value is "1", one of the three 1200-dpi small dots is output as "1" and the remaining two small dots are output as "0"s. Similarly, if a value is "2", two of the three 1200-dpi small dots are output as "1"s and the remaining one small dot is output as "0". If a value is "3", all three 1200-dpi small dots are output as "1"s.

In a case where the input image data is binary 400-dpi image data, three small 1200-dpi dots are gathered together. If the input binary data is "0", all three of the small dots are output as "0"s, and if the input binary data is "1", all three of the small dots are output as "1"s. The binary 400-dpi image data is thus developed. The developed data consisting of "0s" or "1s" is printed by the printer 700.

In the first embodiment, a case is described in which input two- and four-level image data is developed at 400 dpi in the main-scan direction. In a case where image data having a resolution of 400 dpi in the main-scan direction is output to the printer 700, which is capable of binary recording at a resolution of 1200 dpi in the main-scan direction, the input four-level image data is made to correspond to numbers of three small dots of 1200 dpi, thereby making it possible to record four-level, 400-dpi image data, as described above. Further, in a case where the input data is binary 400-dpi image data, three small dots of 1200 dpi are made "0" or "1" collectively, thereby making it possible to record binary 400-dpi image data.

A rule for arranging the small dots in the first embodiment will be described first.

Figure 9A:
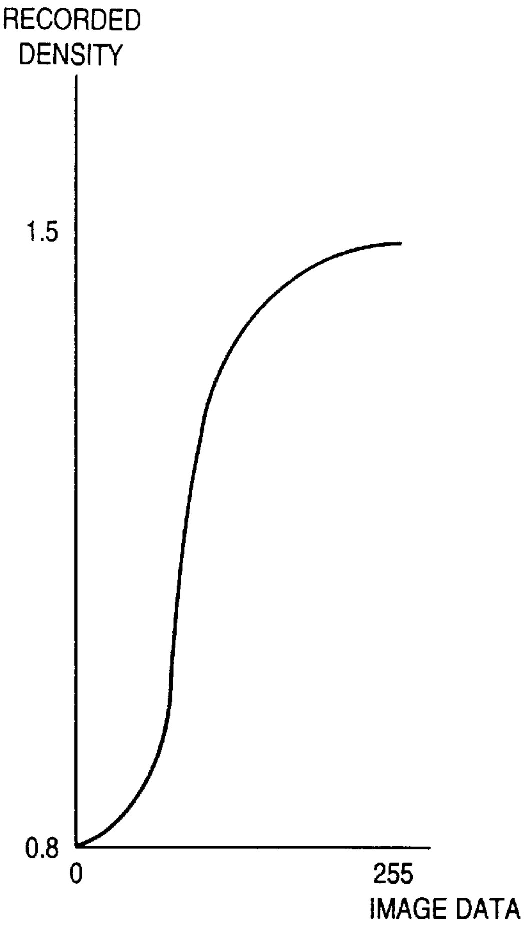
FIGS. 9A and 9B are graphs showing examples of recording characteristics of four-level data in the first embodiment.

FIG. 9A is a graph illustrating the relationship between density data and recording density in a case where 255-tone image data is converted to four levels by four-level error diffusion processing and the four-level image data is so arranged that the small dots are arrayed systematically from the left in dependence upon image density.

Ordinarily, the printer 700, such as laser printer, operates in such a manner that the emission from a semiconductor laser is turned on and off in dependence upon whether the input image data is "1" or "0", with a point at which the laser beam has been turned on being recorded in the color black. Since the dot produced by the laser beam is round and the dot represents all black, a dot size is selected such that mutually adjacent dots will gradually overlap each other. Consequently, if the on/off data is data having a high frequency in which black and white alternate, the image will be recorded as an image comprising dots that tend to become black overall and "flat". For this reason, recording density versus image data density is highly non-linear.

When the small dots are arranged in accordance with the first embodiment taking into consideration the characteristic of the printer 700, a pattern 0 is selected and black dots "1" are arranged from the right side in case of even-numbered pixels, and a pattern 1 is selected and black dots "1" are arranged from the left side in case of odd-numbered pixels, as shown below. By thus developing the small dots, frequency components of the output data are suppressed and it is possible to eliminate patterns in which black and white alternate. At the same time, since black dots are arranged so as to become continuous to the maximum extent, flattening of the image due to excessive enlargement of dots is suppressed.

| Pixel Density | Even-numbered Pixels (Pattern 0) | Odd-numbered Pixels (Pattern 1) |
|---|---|---|
| 0 | 000 | 000 |
| 1 | 001 | 100 |
| 2 | 011 | 110 |
| 3 | 111 | 111 |

Figure 9B:
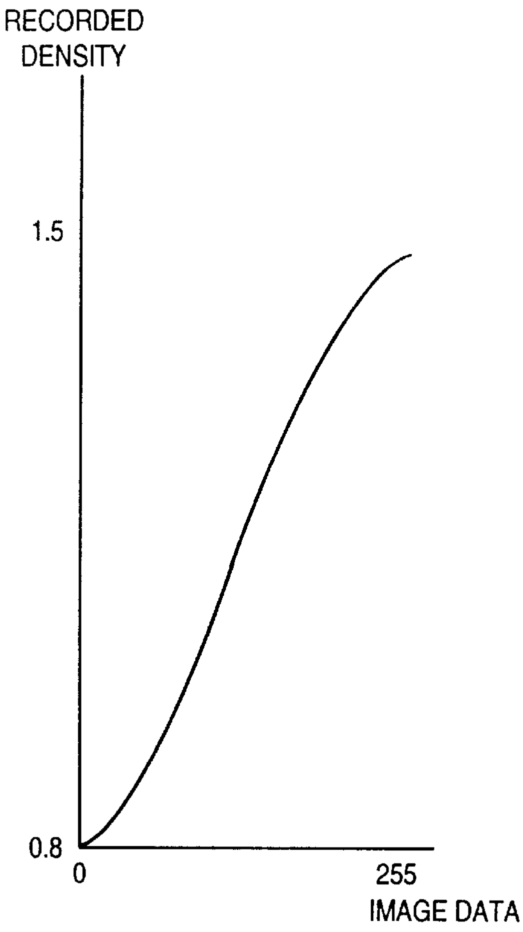

FIG. 9B is a graph illustrating the relationship between image density data and recording density in a case where 255-tone image data is converted to four levels by four-level error diffusion processing and the four-level image data is recorded upon being developed into small dots using the above-described symmetric patterns.

FIG. 9B differs from FIG. 9A in that the relationship between image data density and recording density is considerably more linear. This means that when recording is performed by dot development using the above-mentioned patterns 0, 1, it is possible to record an image of superior tonality.

When the patterns 0, 1 are used, problems do not arise in terms of expressing halftones. In case of characters or line drawings, however, there is a possibility that the recorded image will lack sharpness at the edge depending upon whether a pixel at the edge corresponds to even number or an odd number.

Figure 10A:
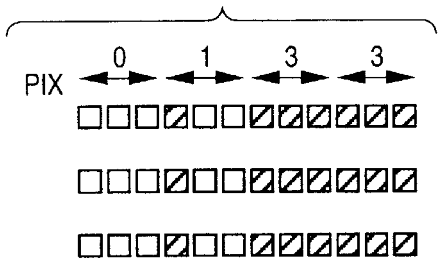
FIG. 10A is a diagram useful in describing the occurrence of a false line at the edge portion of image data.

FIG. 10A is a diagram showing an example in which a false line is produced at an edge because a low-density portion of the edge is an odd-numbered pixel in the main-scan direction.

In order to prevent this problem at edge portions, the following exception processing is executed in accordance with the first embodiment: Specifically, when image data that has been converted to m levels is entered, intermediate values wherein the density of a pixel of interest is "1"~"(m-1)" are taken and it is determined whether the pixels neighboring this pixel on both sides satisfy Equations (7) and (8). If the equations are satisfied, a fixed pattern is selected irrespective of whether the pixel is even- or odd-numbered. In other words, the density of the pixel of interest and the densities of the pixels of interest to the left and right are compared to sense whether the pixel of interest is the at edge portion of the image. If the pixel of interest is at the edge, small dots are arrayed in dependence upon the tendency exhibited by the pixel density, thereby improving the reproducibility of the edge portion. Let DATn−1 represent the pixel data on the left side of DATn, and let DATn+1 represent the pixel data on the right side of DATn.

$$DATn-1<DATn<DATn+1 \rightarrow \text{pattern } 0 \quad (7)$$

$$DATn-1>DATn>DATn+1 \rightarrow \text{pattern } 1 \quad (8)$$

Figure 10B:
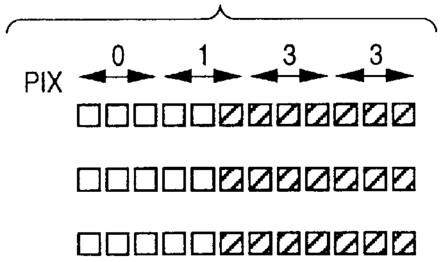
FIG. 10B is a diagram showing an example in which the occurrence of the false line is suppressed by the first embodiment.

FIG. 10B is a diagram showing an example of output in a case where exception processing has been introduced to even-number/odd-number symmetrical pattern development according to the first embodiment.

It will be understood that excellent results are obtained without the occurrence of a false line at the edge portion of the image.

A specific example of the construction of the two-level and four-level development unit 600 according to the first embodiment will now be described with reference to FIG. 11.

Figure 11:
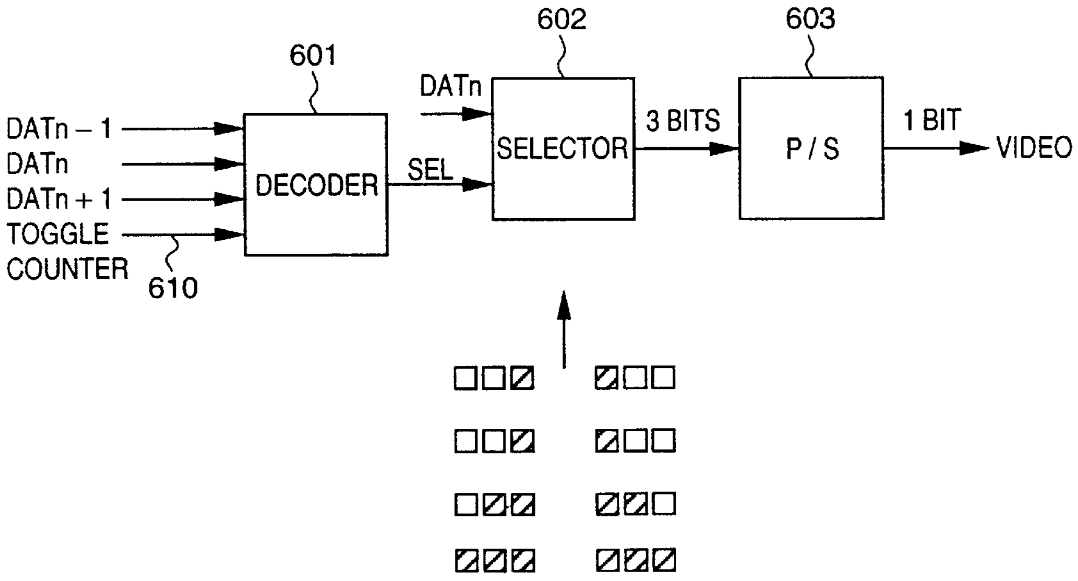
FIG. 11 is a block diagram showing the construction of a two-level and four-level development unit in the first embodiment.

FIG. 11 is a block diagram showing the construction of a circuit which decides the arrangement of small dots in the two-level and four-level development unit 600.

The input image data is image data which, in order to synchronize the image output to the horizontal synchronizing signal of the printer 700, is obtained by buffering image data temporarily in line buffers (not shown) of a plurality of lines and then reading the data out of the line buffers while synchronizing it to the horizontal synchronizing signal. The value (DATn) of the pixel of interest, the values (DATn−1, DATn+1) before and after the pixel of interest in the main-scan direction and an output value 610 of a 1-bit toggle counter which counts the input pixel values enter a decoder 601. Whether a pixel is an even-numbered pixel or an odd-numbered pixel is judged by the output value 610 of the toggle counter.

The decoding logic of the decoder 601 is such that a selection signal SEL, which decides whether to select the above-mentioned pattern 0 or pattern 1 in accordance with the logical expression below described in C language, is output to a selector 602. The selector 602 selects the pattern of small dots in dependence upon the density value of the pixel DATn of interest and the value of the selection signal SEL and outputs the pattern to a parallel/serial converting circuit (P/S) 603. The latter converts input 3-bit data to serial data of a desired speed required by the printer 700 and outputs the serial data to the printer 700 as laser-beam on/off data.

The logical expression mentioned above is as follows:

```
if(DATn=1   ||DATn=2) {
  if ( (DATn-1<DATn) && (DATn<DATn+1) ) {
     SEL=pattern0;
}else if ( (DATn-1>DATn) && (DATn>DATn+1) {
     SEL=pattern1;
}else{
  if(TOGC=1){
     SEL=pattern1;
}else{
     SEL=pattern0;
     }
  }
}else{
  if(TOGC=1) {
     SEL=pattern1;
}else{
      SEL=pattern0;
  }
}
```

In accordance with the first embodiment, as described above, the number of bits of the line buffers for extracting referential data in the sub-scan direction can be reduced. Furthermore, the output range of the luminance-density conversion is changed over depending upon whether the conversion is to two levels or four levels. In processing for making the conversion to four levels, the error data that has been stored in the error buffer by error diffusion is clamped to the number of bits of the significant digits of the error buffer which prevails at the time of the two-level conversion, thereby making it possible to make common use of the same block which executes the processing. In addition, it is possible to generate image data that exploits the recording capability of the printer to the maximum extent.

Further, in accordance with the first embodiment, as described above, when image data that has been converted to m levels is developed into dots and output to the printer 700, small dots are arranged in a pattern which becomes symmetrical in a case where a pixel is an even-numbered pixel and an odd-numbered pixel in the m-level input image data. This makes it possible to greatly improve the grayscale recording characteristic of the printer. Furthermore, the m-level input image data is judged to determine whether a pixel of interest has an intermediate value. If it does, then the neighboring pixels situated to the left and right of the pixel of interest are referred to and the arrangement of the small dots is decided based upon the results of comparing these neighboring pixels with the pixel of interest. This makes it possible to provide image recording in which the reproducibility of image edge portions is improved.

[Second Embodiment]

Next, the algorithm of a technique for making a conversion to a four-level image according to a second embodiment of the present invention will be described. In the case of the conversion to two levels, the conversion is performed by a two-level error diffusion method, which is already known. This method, therefore, need not be described here. According to the second embodiment, processing is executed in the printer 700 so as to change over the pixel density of the output image data as well as the error calculation method in such a manner that the occurrence of isolated black dots is suppressed in areas in which density exhibits poor tracking.

The four-level conversion processing in the second embodiment is based upon four-level error diffusion. As mentioned above, data that presents a problem in the low-cost printer 700 is image data in the vicinity of a threshold value TH1=(DENT1:85+DENT0:0)/2≧42. According to the second embodiment, comparison means is provided for determining whether input image data has a density that causes image unevenness. In a case where the pixel density of the input image data resides in a specific density range, a threshold value DENT1=85 is set to make a comparison with a correction density, which is obtained by adding diffused error to the input image data. When the correction density is greater than the threshold value, the output pixel value is made "2" and the error calculated for this pixel is made a value obtained by subtracting DENT2=170 from the correction density. When the correction density is less than the threshold value, the output pixel value is made "0" and the error calculated for this pixel is made a value obtained by subtracting DENT0=0 from the correction density.

As a result, the four-level output pattern in the specific density area in which image unevenness occurs is changed from the conventional pattern of density "1" and density "0" to pattern of density "2" and density "0". This means that isolated pixels of 1200 dpi will no longer be produced when four-level data is developed and output in this density area. As a result, the dot pattern is produced within a range of resolutions capable of being handled by the printer 700 and the grayscale characteristic is improved.

In a case where the input image data lies outside the specific density range, it will suffice to apply four-level error diffusion processing similar to that of the prior art. The threshold values, output values and errors generated at such time are as indicated by Equations (11) through (14) below.

When the density Xij of an input pixel satisfies the relation DTH1<Xij<DTH2:

If X'ij>DENT1 holds, then output pixel density OUTPUT=2 and error E=X'ij−DENT2 (9)

The values of DTH1 and DTH2 will be described later.

If DENT1≧X'ij holds, then output pixel density OUTPUT=0 and error E=X'ij−DENT0 (10)

When the density Xij of an input pixel satisfies the relation DTH1≧Xij, DTH2≦Xij:

If X'ij>TH3{=(DENT3+DENT2)/2} holds, then output pixel density OUTPUT=3 and error E=X'ij−DENT3 (11)

If TH3≧X'ij>TH2{=(DENT2+DENT1)/2} holds, then output pixel density OUTPUT=2 and error E=X'ij−DENT2 (12)

If TH2≧X'ij>TH1{=(DENT1+DENT0)/2} holds, then output pixel density OUTPUT=1 and error E=X'ij−DENT1 (13)

If TH1≧X'ij holds, then output pixel density OUTPUT=0 and error E=X'ij−DENT0 (14)

Figure 12A:
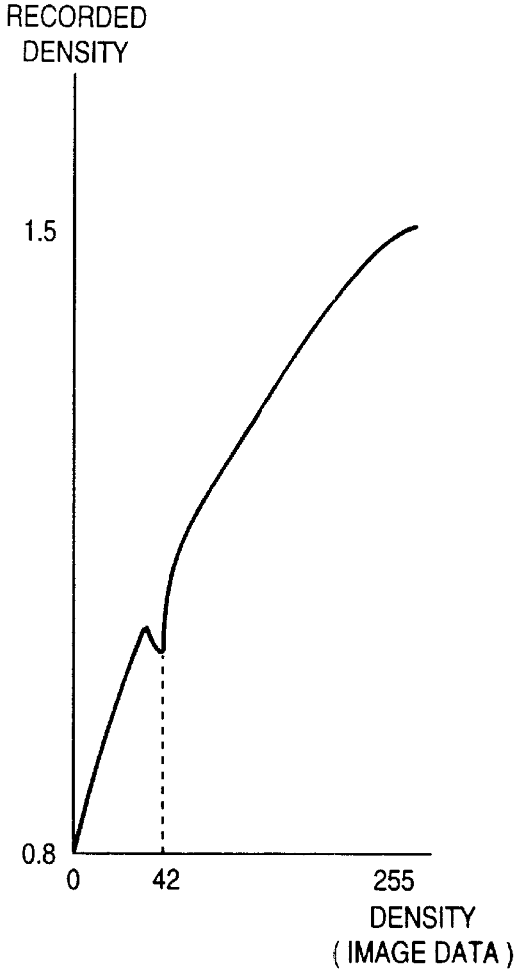
FIGS. 12A and 12B are graphs showing the corresponding relationship between density of data developed to four levels by the prior art and recording density, and the corresponding relationship between density of data developed to four levels by this embodiment and recording density, respectively.
Figure 12B:
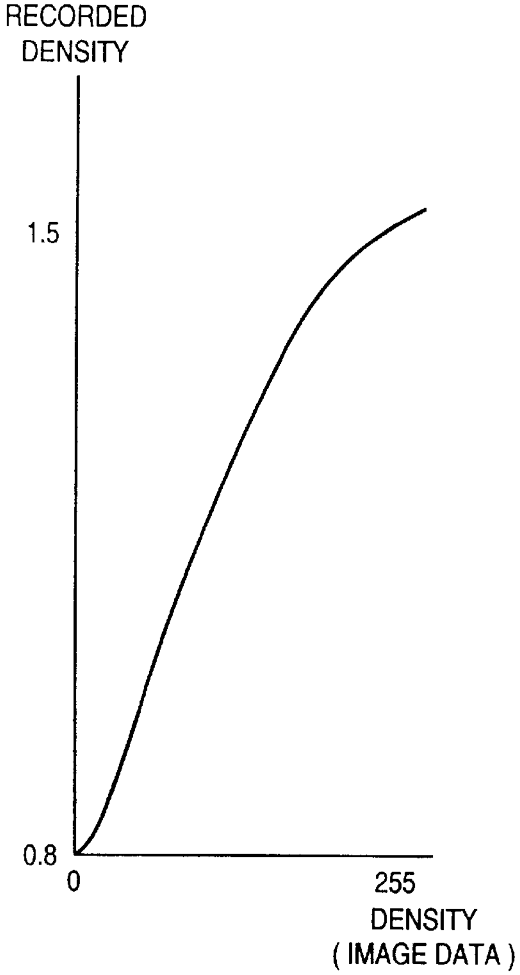

FIG. 12A is a graph illustrating an example in which a patch pattern of density data of 0~255 is recorded using the four-level error diffusion processing and four-level development processing according to the prior art and the density is measured using a density meter, and FIG. 12B is a graph illustrating an example in which a patch pattern of density data of 0~255 is recorded using the four-level error diffusion processing and four-level development processing of this embodiment and the density is measured using a density meter. It should be evident from FIGS. 12A and 12B that there is an improvement in the grayscale characteristic in the vicinity of density "42".

In FIG. 12A, the vicinity of density "42" shows a density area in which the characteristics of a printer cannot follow. Therefore, the values of DTH1 and DTH2 are determined to remove the density area around the density "42", e.g. DTH1=40 and DTH2=44, and may be set to 1 or 2 smaller or larger value, respectively, in order to maintain a linearity of recorded density.

Figure 13:
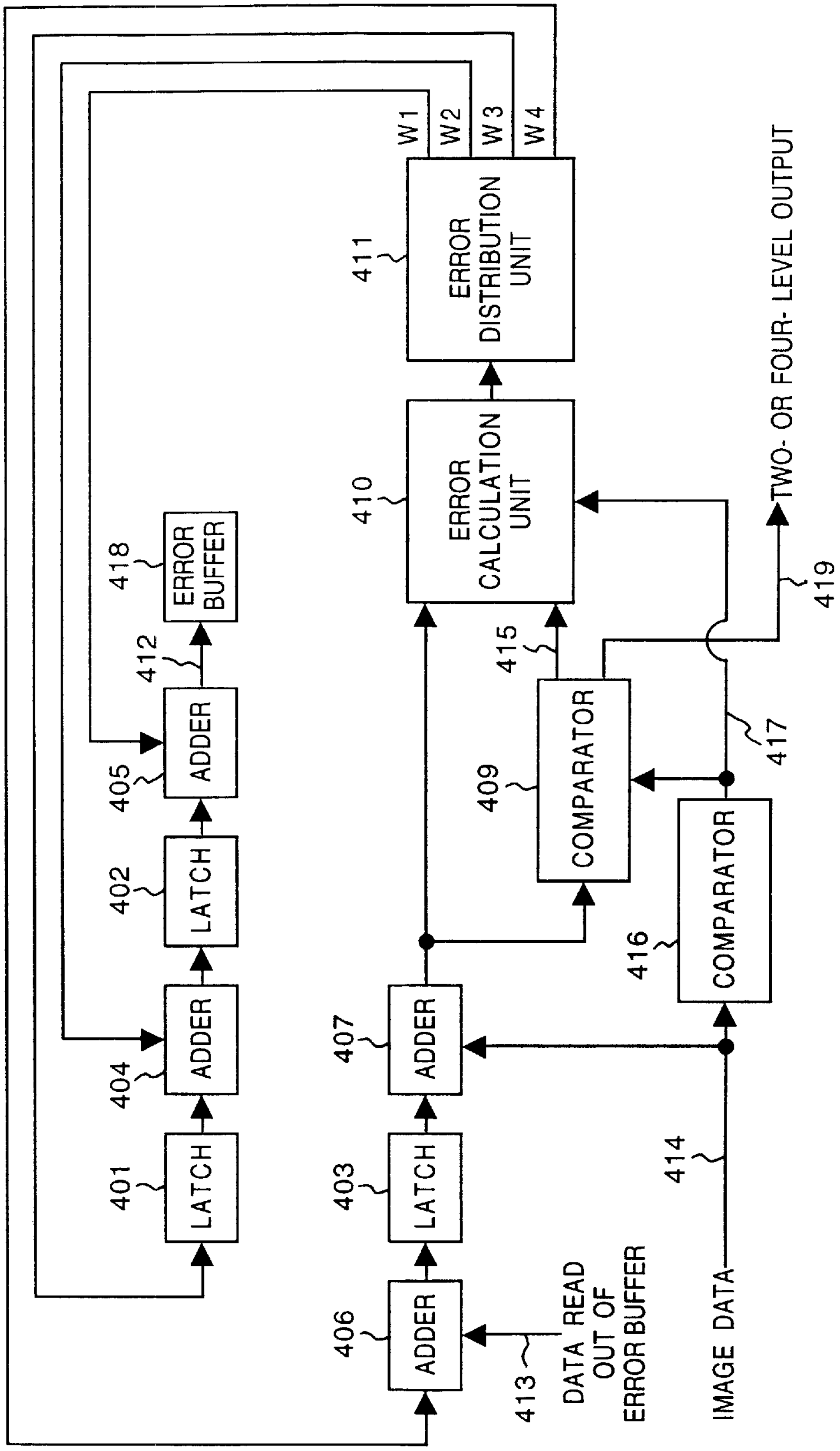
FIG. 13 is a block diagram illustrating the construction of a two-level and four-level error diffusion processing unit in a second embodiment of the present invention.

This will be described with reference to FIG. 13, which shows an example of a circuit for four-level error diffusion processing according to the second embodiment. Components in FIG. 13 identical with those shown in FIG. 8 are designated by like reference characters and need not be described again.

The circuit includes latch circuits 401~403 which hold error data to be weighted and diffused. The data is updated in sync with a pixel clock. Adders 404~407 add data, output by the error distributor 411, in which error produced when pixels are processed has been distributed. A comparator 416 senses whether pixel density of the input image data 414 lies in a specific density area (here greater than DTH1=40 and less than DTH2=44). The comparator 409 compares an input pixel density value, which has been corrected by the error data output from the adder 407 and diffused to the input pixel, with a threshold value and produces an output value 419 as well as a signal 415, which selects the calculation equation for calculating error in the error calculating unit 410. The latter, which receives the selection signal 415 from the comparator 409, a selection signal 417 from the comparator 416 indicating the results of the comparison and the results of addition from the adder 407 as inputs, calculates a new amount of error of a pixel of interest decided thereby and outputs the amount of error. The error distribution unit 411 weights the new amount of error, which is output by the error calculating unit 410, using the weighting coefficients corresponding to FIG. 7, and distributes the error to the adders 404, 405, 406.

The flow of data in the four-level and two-level conversion processing unit 400 will be described.

First, the input image data 414 is added to the output (diffused error data) of latch 403 in the adder 407, and the sum is output to the comparator 409 and error calculating unit 410. The comparator 416 senses whether the density of the input pixel lies in the specific density area. On the basis of the results of comparison from the comparator 416, the comparator 409 decides the four-level output values depending upon a comparison between the corrected pixel data, which is the output of the latch 403, with each of the threshold values TH1~TH3 or DENT1, as indicated by Equations (9) (10) or Equations (11)~(14) above, and simultaneously outputs the selection signal 415, which selects the calculation equation for the new amount of error, to the error calculating unit 410. The error calculating unit 410, which has subtracting circuits (not shown) corresponding to the Equations (11)~(14) [Equation (9) uses a subtraction equation the same as Equation (12) and Equation (10) uses a subtraction equation the same as Equation (13)], selects which results of Equations (11)~(14) to use in dependence upon the selection signals 415 and 417 from the comparators 416 and 409 and outputs a new amount of error.

It should be noted that calculation of the new amount of error may be performed by changing over the values to undergo subtraction in the subtractors of the error calculating unit 410 by means of the selection signals 415, 417 from the comparators 409, 416.

The new amount of error output by the error calculating unit 410 is subjected to weighting corresponding to FIG. 7 by the error distribution unit 411 and the results are output to the adders 404, 405, 406 and latch 401. Here an error weighted by "W3" is latched in the latch 401, whereby the error is added to the error weighted by "W2", generated by the error calculation for the next pixel, in the adder 404. The output of the adder 404 is latched in the latch 402 and is further added to the error weighted by "W1", generated by the error calculation for the next pixel, in the adder 405. The output of the adder 405 is stored temporarily in the error buffer 418 in order to be delayed by one line of data and is read out when the next line is processed.

The adder 406 adds the value, delayed by one line, read out of the error buffer 418 and the error weighted by "W4". The sum is latched in the latch 403. The latter outputs the sum total of diffused errors as amount of correction. The flow then returns to the adder 407, where the sum total of diffused errors is added to the input image data 414. As a result, the four-level image data 419 is output from the comparator 409.

The construction of the two-level and four-level development unit 600, which is the next stage, is as already described above with reference to FIG. 11.

Thus, as described above, by changing over the output pattern of the m-level error diffusion in a specific density area of the entered image data, the generation of a dot pattern of low density and high frequency components is suppressed even when data that has been converted to m levels in order to be output to the printer 700 is developed. Coarsening of the image does not occur even in a low-cost printer and recording having a superior tonality characteristic can be performed.

FIGS. 14 through 18 are flowcharts in a case where the functions described above are implemented by software. Control programs for executing this processing are stored in the program memory 122 and executed under the control of the CPU 120.

Figure 14:
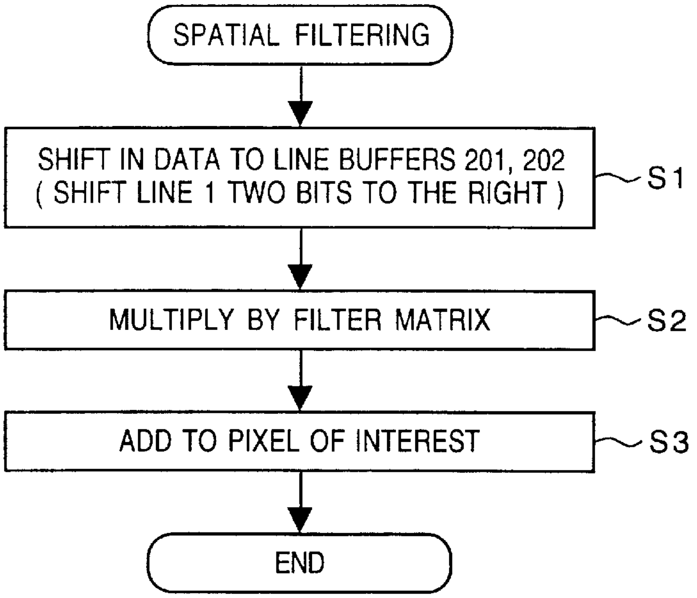
FIG. 14 is a flowchart illustrating spatial filter processing in the image processing apparatus according to the first embodiment.

FIG. 14 is a flowchart illustrating spatial filter processing in the image processing apparatus according to the first embodiment.

Step S1 in FIG. 14 calls for the entered image data (eight bits) to be stored successively in the line buffers 201, 202 in sync with the clock (DCLK). As mentioned above, the image data is shifted two bits to the right and stored as 6-bit data in the line buffer 201. After two lines of image data are thus stored in the line buffers 201 and 202, three lines×three pixels of image data are latched in the latch group 203 in sync with the input of the next line of image data and multiplication with a filter matrix is carried out (step S2). The value thus obtained is added to the pixel of interest and pixel data obtained by application of the filtering operation is output (step S3). The filtering calculation equation is $$filter=X<<2-((A<<2)+(B<<2)+C+D)$$

Figure 15:
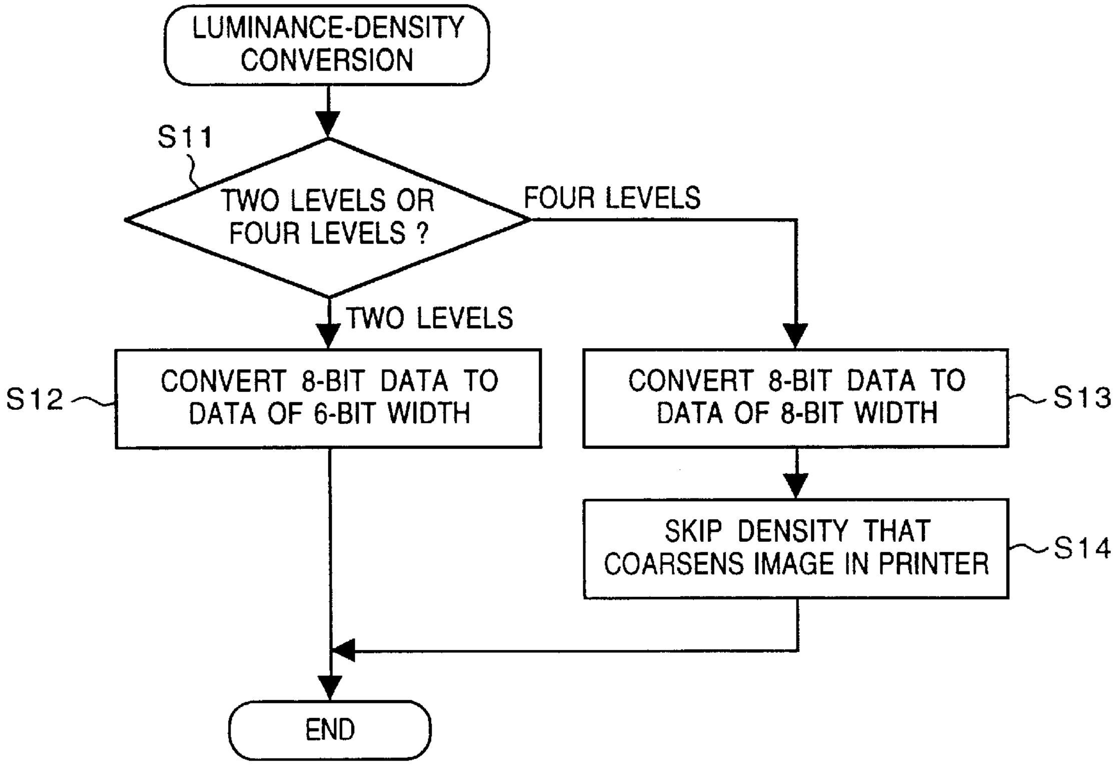
FIG. 15 is a flowchart illustrating luminance-density conversion processing in the image processing apparatus according to the first embodiment.

FIG. 15 is a flowchart illustrating luminance-density conversion processing.

The luminance-density conversion processing is decided depending upon whether two levels or four levels are involved in the four-level/two-level conversion processing that follows. That is, if it is determined at step S11 that processing is performed using two levels, the program proceeds to step S12, where processing is executed to convert white 8-bit data to "0" density data and black 8-bit data to "63" density data. If it is determined a step S11 that four-level processing is to be executed, the program proceeds to step S13, where processing is executed to convert white 8-bit data to "0" density data and black 8-bit data to "255" density data. Further, at step S14, if density (density value "31" in the above-mentioned example) that will produce a coarse image in the printer 700 exists, the conversion to this density value is skipped at step S14. It is ideal if this luminance-density conversion is carried out using a look-up table.

Figure 16:
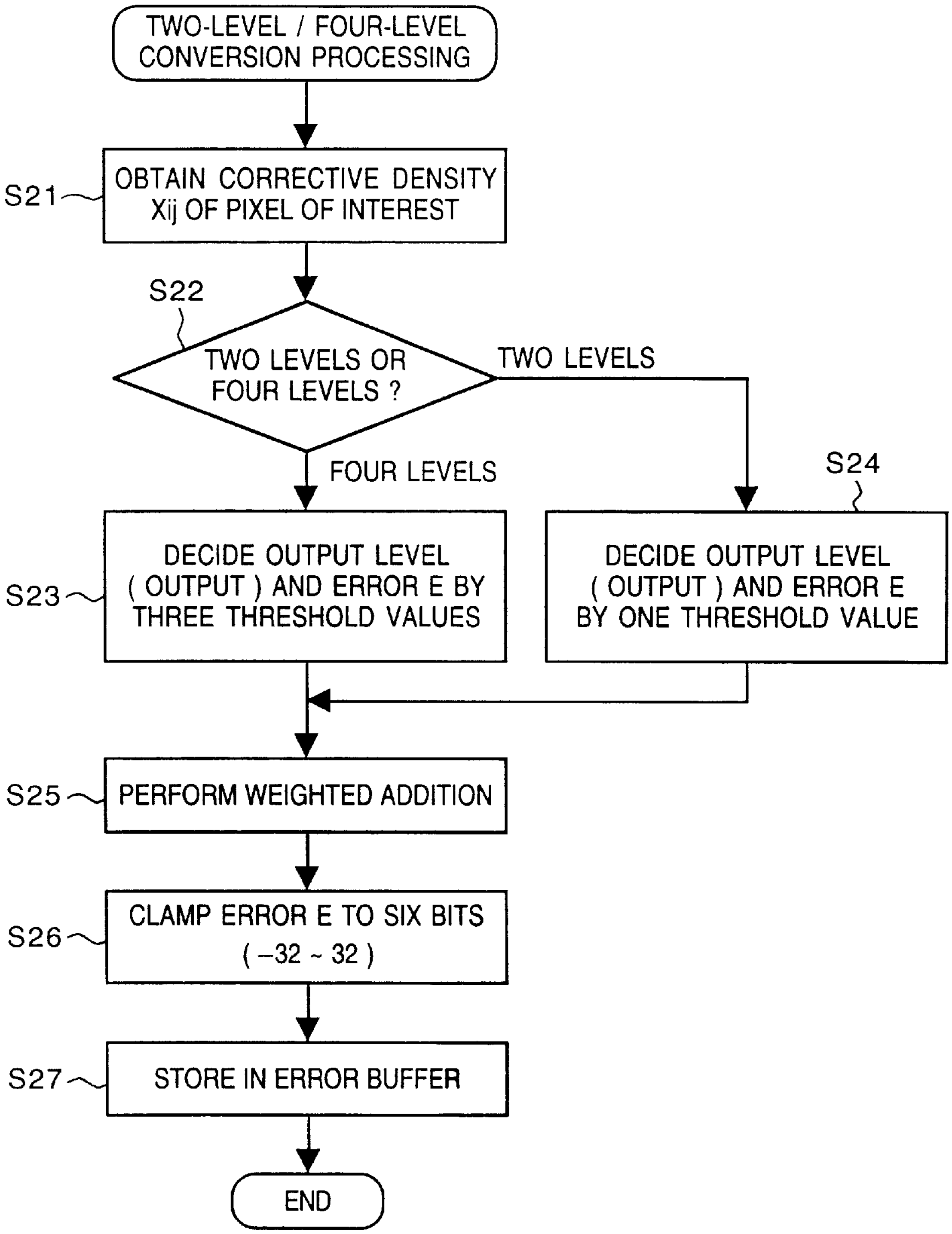
FIG. 16 is a flowchart illustrating two-level and four-level conversion processing in the image processing apparatus according to the first embodiment.

FIG. 16 is a flowchart illustrating two-level/four-level conversion processing. This processing is executing using the two- level or four-level error diffusion processing.

First, the corrective density X'ij of the pixel Xij of interest is obtained at step S21. When the error of the immediately preceding line has been stored in the error buffer 418, the corrective density is decided using the value stored in the error buffer 418. The program then proceeds to step S22, at which it is determined whether two-level or four-level error diffusion is to be performed. In case of four-level error diffusion, the program proceeds to step S23, at which the output level (OUTPUT) and error (E) are obtained by three threshold values, as indicated by the aforementioned Equations (1)~(4). When two-level error diffusion is performed, the program proceeds to step S24, at which the output pixel value (OUTPUT) and error (E) are decided based upon the threshold value (BTH1), as indicated by the Equations (5), (6).

When error is thus decided, the program proceeds to step S25, at which the weighting of FIG. 7 is executed. The error (E) thus obtained is clamped to 6-bit data at step S26. The program then proceeds to step S27, at which the error (E) obtained is stored in the error buffer 418 to effect a delay of one line. The delayed error is referred to in the error diffusion processing of the pixel of the next line.

Figure 17:
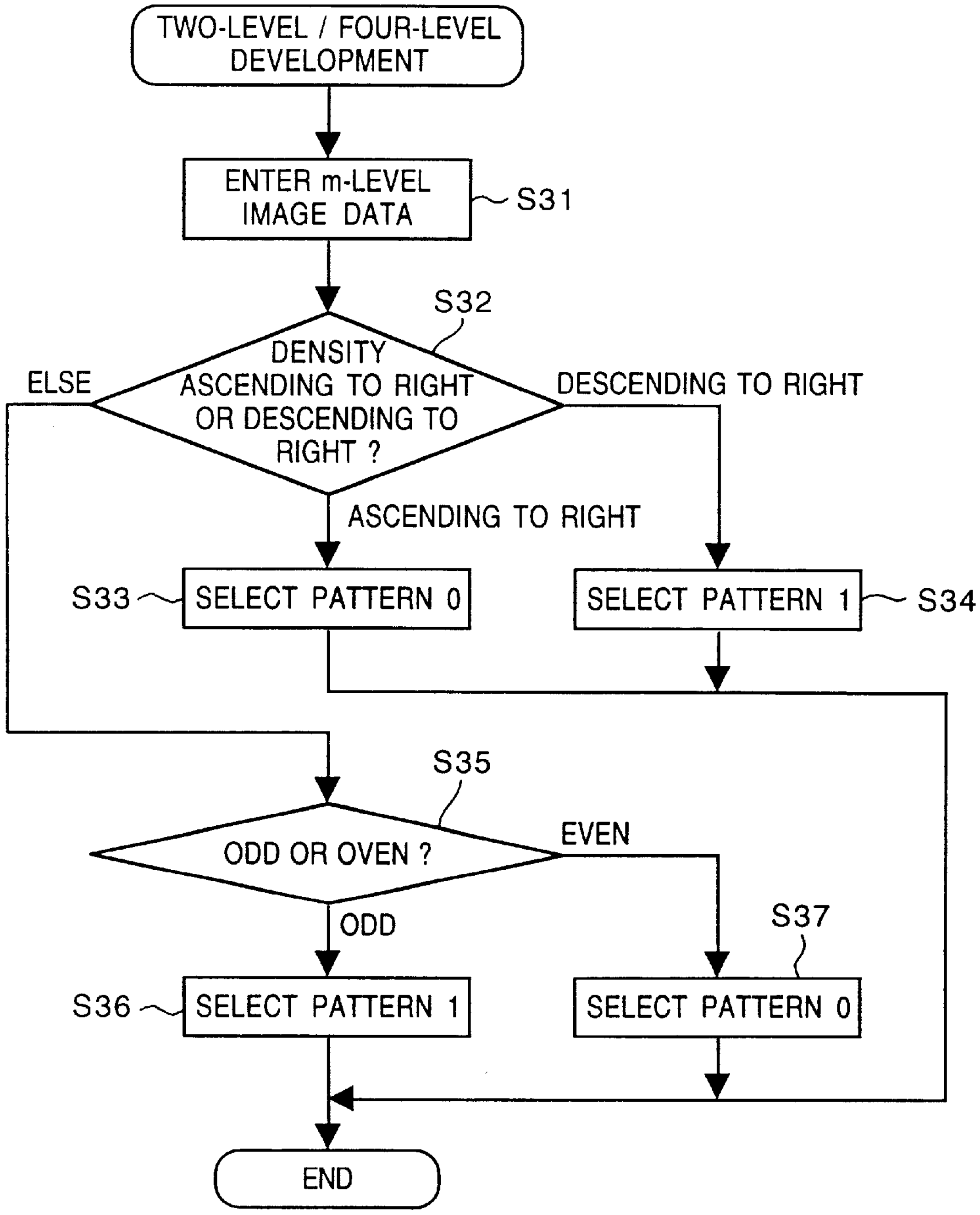
FIG. 17 is a flowchart illustrating two-level and four-level development processing in the image processing apparatus according to the first embodiment.

FIG. 17 is a flowchart illustrating processing for developing two-level/four-level data into two-level data (expressed by small dots).

In FIG. 17, the density gradient of an image is found and the arrangement of the small dots is decided in dependence upon the density gradient. More specifically, m-level image data is entered at step S31. Next, it is determined whether the density gradient of the pixels situated on the right and left sides (in the main-scan direction) of the pixel of interest in the image data ascends to the right or descends to the right (step S32). If the gradient ascends to the right, then the above-mentioned pattern 0 (in which the dots are developed from the right side) is selected (step S33) If the gradient descends to the right, then the above-mentioned pattern 1 (in which the dots are developed from the left side) is selected (step S34).

If there is no density gradient, then the arrangement of the small dots is decided depending upon whether the pixel of interest is an odd-numbered or even-numbered pixel. That is, the m-level image data is entered and it is determined at step S32 whether the pixel of interest of this image data resides on a density gradient. If there is no density gradient, then it is determined whether the pixel of interest is odd- or even-numbered (step S35). If the pixel is odd-numbered, the pattern 1 (in which the dots are developed from the left side) is selected (step S36). If the pixel is even-numbered, the pattern 0 (in which the dots are developed from the right side) is selected (step S37).

Figure 18:
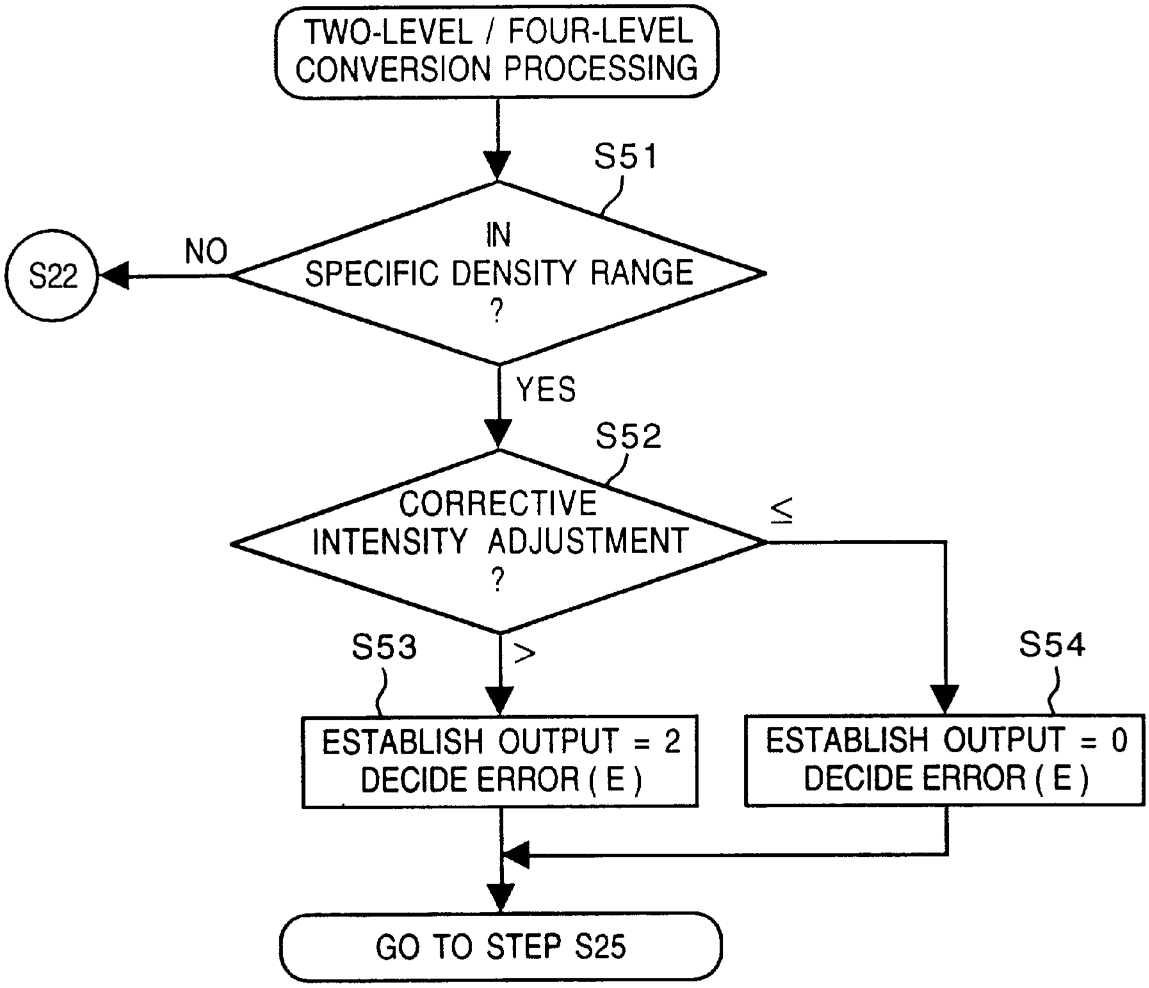
FIG. 18 is a flowchart illustrating two-level and four-level conversion processing in the image processing apparatus according to the second embodiment.

FIG. 18 is a flowchart illustrating two-level/four-level conversion processing according to this embodiment.

First, at step S51, it is determined whether the entered image data falls within a specific density range having a density that will cause density unevenness in the printer 700. If the input image data is determined to lie outside the specific density range, the program proceeds to step S22 in FIG. 16 and the above-described processing is executed.

If the input image data is determined to lie inside the specific density range, then the program proceeds to step S52, at which there is found a corrective density value obtained by adding diffused error to the input image data and this value is compared with a threshold value. If the corrective density value is larger, the program proceeds to step S53, at which the output pixel density (OUTPUT) is made "2" and the error prevailing at this time is obtained. If the corrected density value is equal to or less than the threshold value, then the program proceeds to step S54, at which the output pixel density (OUTPUT) is made "0" and the error prevailing at this time is obtained. When the processing of step S53 or S54 ends, the program proceeds to step S25 in FIG. 16 and the above-described processing is executed.

In accordance with the first and second embodiments, as described above, the number of bits of the line buffers for extracting the referential data in the sub-scan direction in the spatial filter processing unit is reduced. Furthermore, the output range of the luminance-density conversion is changed over depending upon whether the conversion is to two levels or four levels. In processing for making the conversion to four levels, the number of bits of the error data that has been stored in the error buffer 418 by the error diffusion is clamped to the number of bits of the significant digits of the error buffer 418 which prevails at the time of the two-level conversion, thereby making it possible to make common use of the same block which executes the processing of error diffusion. In addition, it is possible to generate image data that exploits the recording capability of the printer to the maximum extent.

[Third Embodiment]

Figure 19:
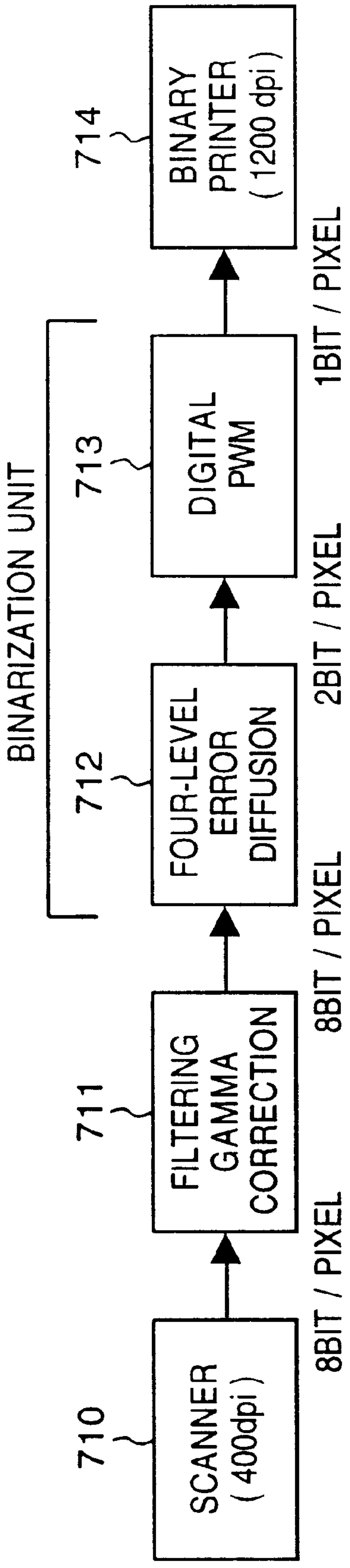
FIG. 19 is a block diagram illustrating the flow of image processing in an image processing apparatus according to a third embodiment of the present invention.

FIG. 19 is a diagram illustrating the flow of image processing in which use is made of a binary printer 714, which has a recording resolution of 1200 dpi, to process and print image data having a reading resolution of 400 dpi in a third embodiment of the present invention.

The apparatus in FIG. 19 includes a scanner 710 having a reading resolution of 400 dpi. The scanner 710 reads a multilevel grayscale image, effects a conversion to a digital signal and subjects the signal to a shading correction. A filter & gamma correction unit 711 subjects the multilevel image data read by the scanner 710 to filtering processing, eliminates moiré produced from the matching between original data resolution and reading resolution, and emphasizes the edges of images. The unit 711 further converts luminance data to density data and applies a gamma correction in conformity with the gamma characteristic of the recording or visual system.

A binarization unit 715 converts the multilevel image data to two-level (i.e. binary) image data and includes a four-level error diffusion block 712 and a digital PWM block 713. The four-level error diffusion block 712 applies the principle of error diffusion to 256-tone image data in which each pixel is represented by eight bits and effects a grayscale conversion while preserving density. The output of the four-level error diffusion block 712 is a four-tone signal of two bits per pixel. Though density is not preserved microscopically, preservation of density does take place over a large area. The image data of four gray levels of two bits per pixel is subsequently binarized (converted to two levels) by the digital PWM block 713 according to the third embodiment and the binarized data is output to the binary printer whose recording resolution is 1200 dpi. These image processing operations are executed in line units.

Figure 20:
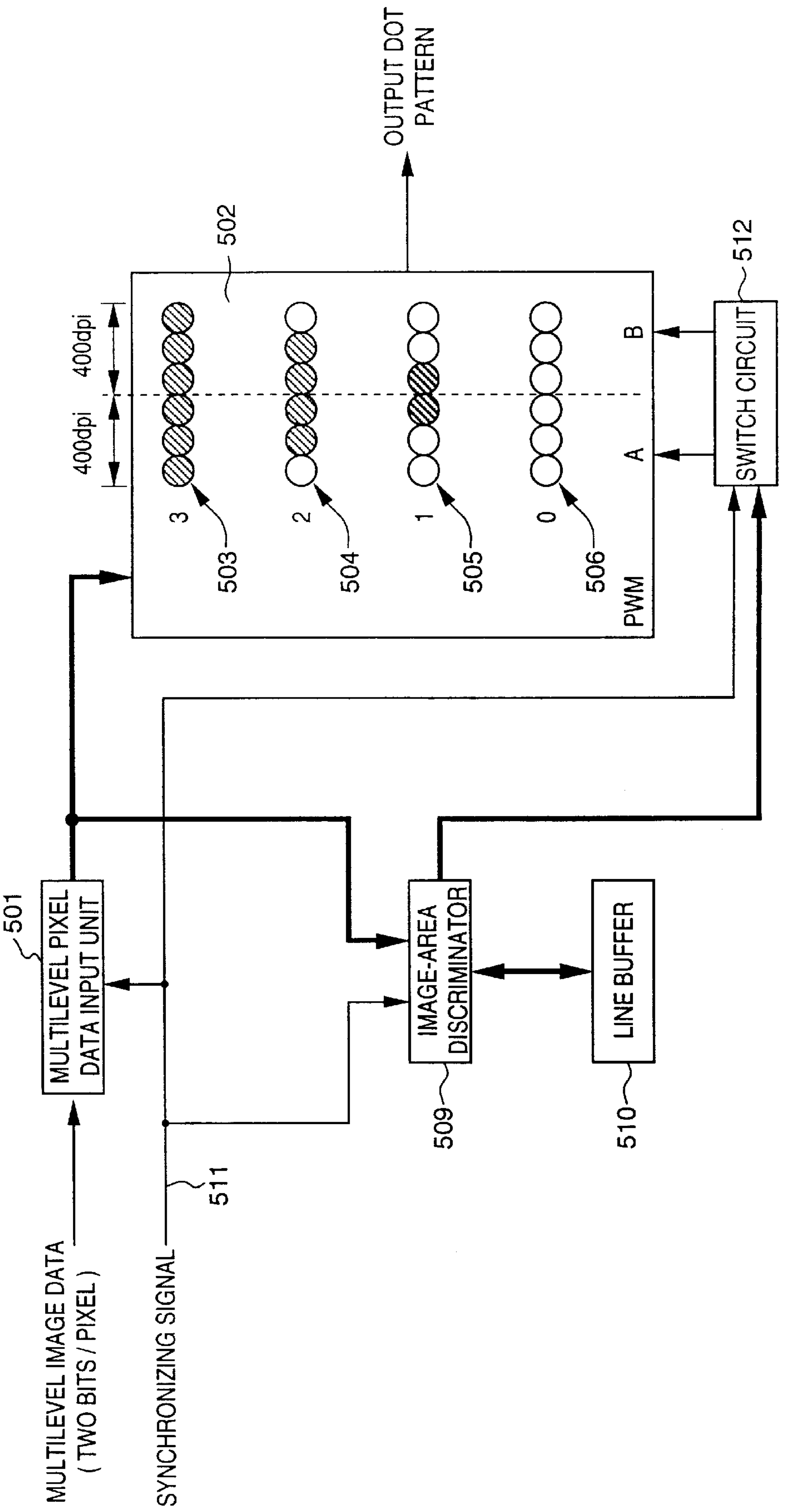
FIG. 20 is a diagram useful in describing digital PWM processing according to the third embodiment.

FIG. 20 is a block diagram showing the construction of the digital PWM block 713 according to the third embodiment.

The digital PWM block 713 includes a multilevel pixel data input unit 501. The image of reduced number of tones obtained by the conversion of the 256-tone pixel data to four-tone (two bits per pixel) pixel data by the processing executed in the preceding four-level error diffusion block 712 enters the multilevel pixel data input unit 501 one pixel at a time. Here "3" (shown at 503 in FIG. 20) of the four-tone data corresponds to a density of "255" of the 256-tone densities, "2" (shown at 504 in FIG. 20) corresponds to a density of "170", "1" (shown at 505 in FIG. 20) corresponds to a density of "85", and "0" (shown at 506 in FIG. 20) corresponds to a density of "0". The third embodiment is premised on four-level error diffusion processing for the sake of simplicity. However, it is possible to practice the present invention without limitation to four levels. For example, eight-level digital PWM would be employed for an eight-level image input.

Next, the image data that has been converted to four tones enters a PWM converter 502 in pixel units. The multilevel pixel data thus entered is converted to dot patterns that correspond to the respective pixel densities and the dot patters are delivered as an output. An output dot patterns that correspond to the densities of the input pixel data are as indicated at 503 through 506 in FIG. 20. In this case, one dot constituting an output dot pattern has a resolution of 1200 dpi with regard to an input pixel data resolution of 400 dpi. Accordingly, it is required that the output pixel clock have a frequency that is three times the frequency of the input pixel clock. Further, the number of pixels on one line (the number of pixels in the main-scan direction) is increased three-fold as well. It should be noted that one dot (1200 dpi) constituting an output dot pattern has a size that is one-third of one input pixel (400 dpi).

In an image-area discriminating unit 509, a special-purpose line buffer 510 for storing several lines of multilevel image data undergoing processing is provided. This makes it possible to accumulate several preceding lines of data along with the line currently undergoing processing. As a result, the image-area discriminating unit 509 is capable of determining, in two dimensions, the particular area in which a pixel currently being executed resides (i.e. whether the pixel is part of a character image or halftone image). It is assumed that the area discriminating algorithm used in the image-area discriminating unit 509 is one that is well known. The image-area discrimination is performed in sync with the input pixel data and the results of discrimination are output to a switch 512 one pixel at a time. A synchronizing signal 511 synchronized to the input of pixel data is sent to each processing block to synchronize processing.

The switch circuit 512 receives the results of discrimination from the image-area discriminating unit 509 and changes over the output pattern from the digital PWM block 502. The output pattern is changed over between an A pattern and a B pattern (indicates at A and B, respectively, in FIG. 20). In a case where the pixel undergoing processing is included in a character or line-drawing image, the switch 512 selects the A pattern in response to the signal from the image-area discriminating unit 509, thereby outputting a dot pattern having the grayscale that corresponds to the input pixel data. Thereafter, processing is performed in similar fashion without changeover even in a case where a pixel contained in a character or line drawing image enters. Accordingly, the output of the digital PWM 502 is a high-resolution pattern equivalent to 400 dpi.

On the other hand, in a case where the pixel undergoing processing is contain in a halftone (photographic) image area, the switch circuit 512 selects the B pattern and outputs a dot pattern corresponding to the input pixel density. In a case where the result of discriminating the next input pixel indicates that the pixel is contained in a halftone image area, the output pattern is switched so that the A pattern is selected and output. Thenceforth, each time an input pixel is discriminated to be in a halftone image area, the pattern is toggled between the A pattern and B pattern and digital PWM processing corresponding to 200 dpi is executed.

Figure 24:
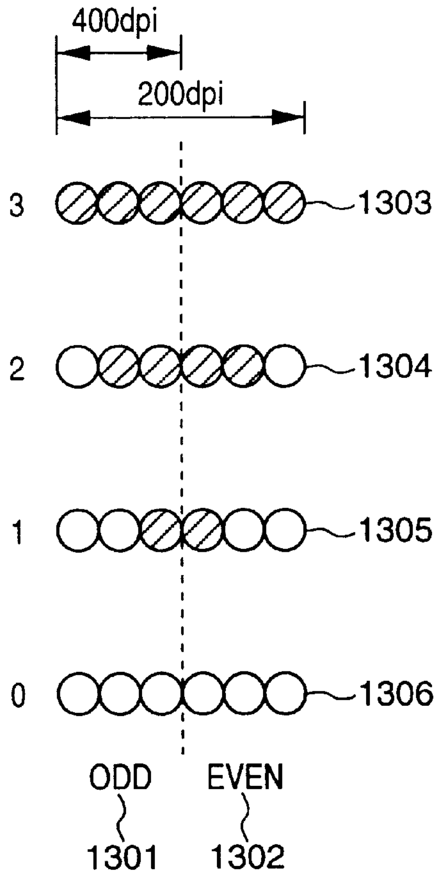
FIG. 24 is a diagram showing an example of recording of dots by digital PWM, specifically an example in which recording is performed by changing over dot patterns alternately depending upon odd- and even-numbered pixels.
Figure 25:
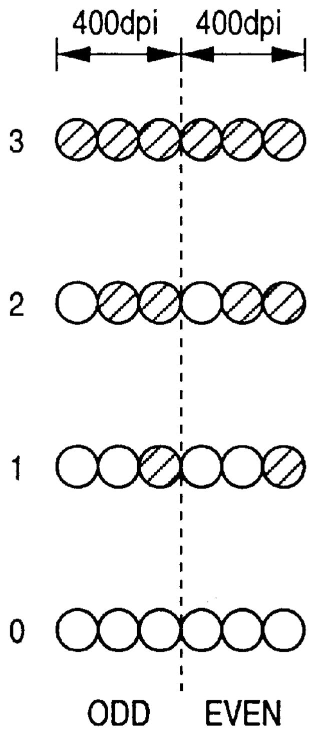
FIG. 25 is a diagram showing an example of recording of dots by digital PWM, specifically an example in which the same dot pattern is always recorded regardless of odd- and even-numbered pixels.

In a case where the A and B patterns are output alternately to switch the direction of the dot pattern, the digital PWM-converted dot strings of the immediately preceding pixel and current pixel take on a low resolution of 200 dpi, as shown in FIG. 24. However, in a state in which, say, the A pattern is output continuously without a reversal in the direction of the dot pattern, the dot strings of the immediately preceding pixel and current pixel maintain a high resolution of 400 dpi, as shown in FIG. 25. This changeover of the output dot pattern resolution is performed in dependence upon the attributes of the input multilevel image data.

Thus, digital PWM processing adapted to the attributes of the image area in which the input pixel data is contained is implemented so that ideal digital PWM processing can be applied even to an image which is a mixture of character/line images and halftone images. The 1200 dpi pixel data adaptively PWM-converted in this fashion is output to the binary printer 714 as an output dot pattern. The binary printer 714 is a, say, a 1200-dpi laser printer. It should be noted that the image processing apparatus illustrated in the third embodiment is applicable to an image processing system for image processing applications used in a digital copier, facsimile machine or multimedia equipment.

Figure 21:
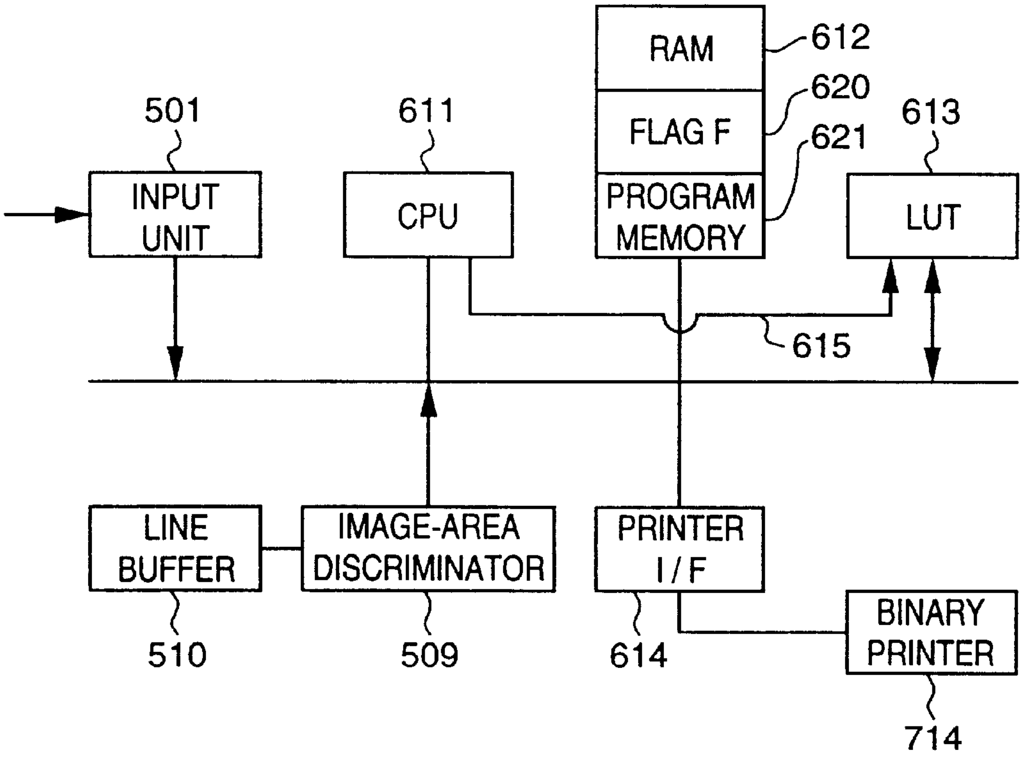
FIG. 21 is a diagram showing the construction of a digital PWM processing circuit according to the third embodiment.

FIG. 21 is a block diagram illustrating an example of the digital PWM circuit 713 according to the third embodiment. Here the digital PWM circuit 713 is illustrated as being implemented by a CPU 611 and software executed by the CPU 611. However, this does not impose a limitation upon the present invention, for implementation by hardware is feasible as well.

The CPU 611 controls the overall operation of the digital PWM circuit 713 in accordance with a control program that has been stored in the program memory 621. A RAM 612, which functions as a main memory, stores a flag F 620, described later, and has a program memory 621 which stores the control program executed by the CPU 611 as well as various data. It should be noted that the control program stored in the program memory 621 may be a program downloaded from a floppy disk or the like, not shown. A look-up table (LUT) 613, which implements the digital PWM of the third embodiment, receives two-bit pixel data as an address input. The LUT 613 outputs a dot pattern that corresponds to the input pixel data, i.e. the A pattern when a signal 615 output by the CPU 611 is at the high level and the B pattern when the signal 615 is at the low level. A printer interface (I/F) 614 controls interfacing with the binary printer 714. The image-area discriminating unit 509 and line buffer 510 are the same as those shown in FIG. 20. It should be noted that the image-area discrimination processing may be implemented by a program executed by the CPU 611.

Figure 22:
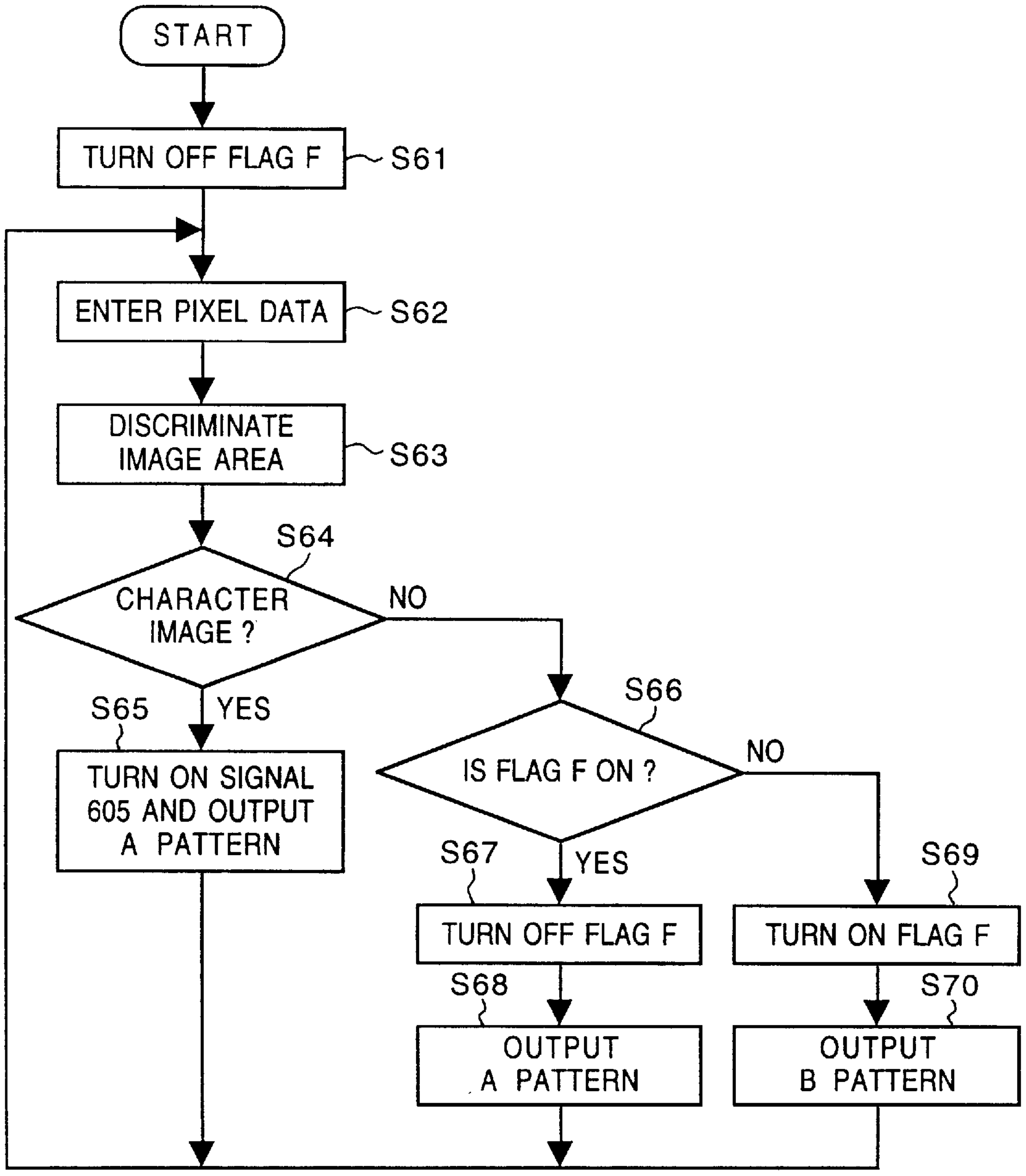
FIG. 22 is a flowchart showing the operation of the digital PWM processing circuit according to the third embodiment.
Figure 23A:
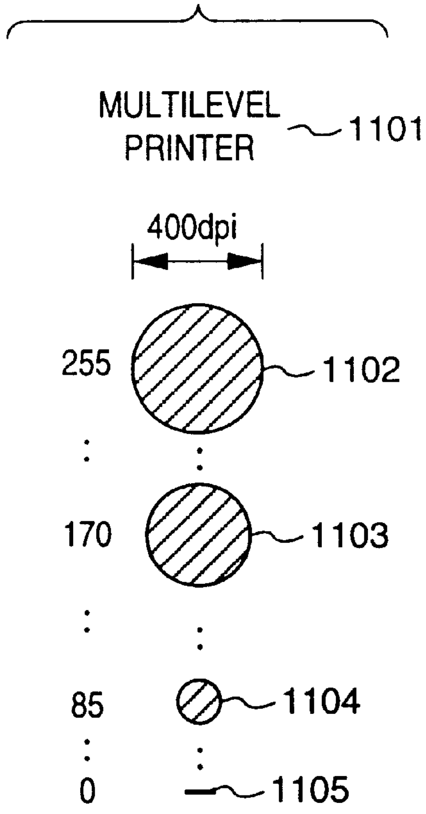
FIGS. 23A and 23B are diagrams for describing examples of recording of multilevel image data by a multilevel printer and binary printer.
Figure 23B:
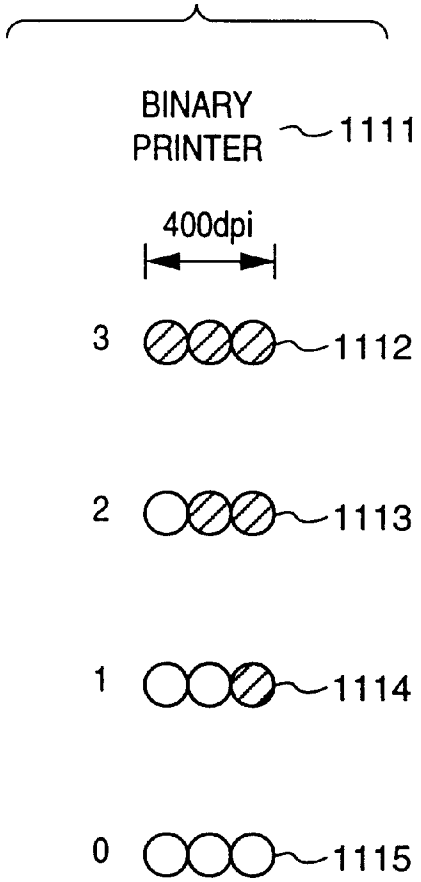

FIG. 22 is a flowchart illustrating control processing executed by the CPU 611 according to the third embodiment. The control program for executing this processing has been stored in the program memory 621. It is assumed here that several lines of image data are stored in the line buffer 510 before processing is executed.

The flag F 620 in RAM 612 is turned off at step S61 and pixel data is entered at step S62. This is followed by step S63, at which the image-area discriminating unit 509 determines whether the image area corresponding to this pixel is indicative of a character image or halftone image. When the pixel is that of a character, the program proceeds to step S65, at which the signal 615 is raised to the high level so that the A pattern is output from the LUT 613.

When the pixel is not that of a character image, on the other hand, the program proceeds from step S64 to step S66, where it is determined whether the flag F 620 is on. If the flag F is on, the program proceeds to step S67, where the flag F is turned off, thence to step S68, where the signal 615 is raised to the high level so that the A pattern is output from the LUT 613.

If the flag F is not on, then the program proceeds to step S69, where the flag F is turned on, thence to step S70, where the signal 615 is made the low level so that the B pattern is output from the LUT 613.

In accordance with the third embodiment, as described above, the attribute (character/line-drawing image area or halftone image area) of an image area in which an input pixel resides is investigated and control is effected so as to switch the output dot pattern adaptively. This makes it possible to perform printing using a binary printer while maintaining excellent image quality for both halftone images and characters or line-drawing images. In particular, it is possible to apply excellent digital PWM processing even to an image input that is a mixture of characters and/or line-drawing images and halftone images.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes of software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the functions of the above embodiments.

The present invention is not limited to the above embodiments and various changes and modification can be made within the spirit and scope of the present invention. Therefore, to apprise the public of the scope of the present invention, the following claims are made.

What is claimed is:

1. An image processing apparatus comprising:

image input means for entering multilevel image data in which one pixel is represented by n-levels;

filter means for applying spatial filtering processing to the multilevel image data entered by said image input means;

processing means for processing the image data filtered by said filter means in such a manner that each pixel of the image data is subjected to an m-level conversion (where $2<m<n$); and dot arranging means for converting the image data, which has been converted to m-level image data by said processing means, to an array of dots having a resolution higher than resolution of the image data;

wherein said dot arranging means arranges the image data in such a manner that patterns for even-numbered pixels and patterns for odd-numbered pixels are symmetrical, and said dot arrangement means converts the image data, which has been converted to m-levels, to a dot array of $m-1$ dots.

2. The apparatus according to claim 1, wherein the value of m is four and said dot arranging means converts the image data, which has been converted to m levels, to a dot array of three dots.

3. An image processing apparatus comprising:

image input means for entering multilevel image data in which one pixel is represented by n-levels;

filter means for applying spatial filtering processing to the multilevel image data entered by said image input means;

processing means for processing the image data filtered by said filter means in such a manner that each pixel of the image data is subjected to an m-level conversion (where $2<m<n$); and dot arranging means for converting the image data, which has been converted to m-level image data by said processing means, to an array of dots having a resolution higher than resolution of the image data;

wherein said dot arranging means changes the direction of the array of dots in dependence upon a density gradient of pixels neighboring a pixel of interest in the image data, and said dot arranging means converts the image data, which has been converted to m-levels, to a dot array of m−1 dots.

4. The apparatus according to claim 3, wherein the value of m is four, and said dot arranging means converts the image data, which has been converted to m levels, to a dot array of three dots, arranges said dots from the right side when the density gradient ascends to the right and arranges said dots from the left side when the density gradient descends to the right.

5. An image processing method comprising:

an image input step of entering multilevel image data in which one pixel is represented by n-levels;

a filter step of applying spatial filtering processing to the multilevel image data entered at said image input step;

a processing step of processing the image data filtered at said filter step in such a manner that each pixel of the image data is subjected to an m-level conversion (where 2<m<n); and a dot arranging step of converting the image data, which has been converted to m-level image data at said processing step, to an array of dots having a resolution higher than resolution of the image data, and arranging the image data in such a manner that patterns for even-numbered pixels and patterns for odd-numbered pixels are symmetrical, and the image data, which has been converted to m-levels, is converted to a dot array of m−1 dots at said dot arranging step.

6. The method according to claim 5, wherein the value of m is four and the image data, which has been converted to m levels, is converted to a dot array of three dots at said dot arranging step.

7. An image processing method comprising:

an image input step of entering multilevel image data in which one pixel is represented by n-levels;

a filter step of applying spatial filtering processing to the multilevel image data entered at said image input step;

a processing step of processing the image data filtered at said filter step in such a manner that each pixel of the image data is subjected to an m-level conversion (where 2<m<n); and a dot arranging step of converting the image data, which has been converted to m-level image data at said processing step, to an array of dots having a resolution higher than resolution of the image data, and changing the direction of the array of dots in dependence upon a density gradient of pixels neighboring a pixel of interest in the image data, and said dot arranging step converts the image data, which has been converted to m-levels, to a dot array of m−1 dots.

8. The method according to claim 7, wherein the value of m is four, and said dot arranging step converts the image data, which has been converted to m levels, to a dot array of three dots, arranges said dots from the right side when the density gradient ascends to the right and arranges said dots from the left side when the density gradient descends to the right.

* * * * *

UNITED STATES PATENT AND TRADEMARK OFFICE

CERTIFICATE OF CORRECTION

PATENT NO. : 6,011,878

DATED : January 4, 2000

INVENTOR(S) : KATSUTOSHI USHIDA ET AL.

It is certified that error appears in the above-identified patent and that said Letters Patent is hereby corrected as shown below:

IN THE DRAWINGS:

Sheet 15 of 22, FIG. 17, "OVEN?" should read --EVEN?--.

COLUMN 9:

Line 15, "actualoperation" should read --actual operation--; and
Line 36, "addition.⟨Luminance-density" should read --addition.¶⟨Luminance-density--.

COLUMN 11:

Line 21, "a s nd" should read --and--; and
Line 52, "converts" should read --it converts--.

COLUMN 14:

Line 27, "even" should read --an even--.

COLUMN 21:

Line 49, "patters" should read --patterns--; and
Line 54, "have" should read --has--.

UNITED STATES PATENT AND TRADEMARK OFFICE
CERTIFICATE OF CORRECTION

PATENT NO. : 6,011,878

DATED : January 4, 2000

INVENTOR(S) : KATSUTOSHI USHIDA ET AL.

It is certified that error appears in the above-identified patent and that said Letters Patent is hereby corrected as shown below:

COLUMN 22:

Line 26, "is contain" should read --is contained--; and

Line 54, "a, say, a" should read --a, say,--.

Signed and Sealed this

First Day of May, 2001

Attest:

Nicholas P. Godici

NICHOLAS P. GODICI

*Attesting Officer*

*Acting Director of the United States Patent and Trademark Office*